(12) United States Patent
Izhikevich

(10) Patent No.: US 9,405,975 B2
(45) Date of Patent: Aug. 2, 2016

(54) APPARATUS AND METHODS FOR PULSE-CODE INVARIANT OBJECT RECOGNITION

(75) Inventor: Eugene M. Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 1072 days.

(21) Appl. No.: 13/152,084

(22) Filed: Jun. 2, 2011

(65) Prior Publication Data
US 2012/0308136 A1    Dec. 6, 2012

(51) Int. Cl.
| G06K 9/00 | (2006.01) |
| G06K 9/46 | (2006.01) |
| G06K 9/52 | (2006.01) |
| G06N 3/00 | (2006.01) |
| G06N 3/04 | (2006.01) |

(52) U.S. Cl.
CPC .............. *G06K 9/00744* (2013.01); *G06K 9/46* (2013.01); *G06K 9/52* (2013.01); *G06N 3/008* (2013.01); *G06N 3/049* (2013.01)

(58) Field of Classification Search
USPC ....................................................... 382/243
See application file for complete search history.

(56) References Cited

U.S. PATENT DOCUMENTS

| 5,063,603 | A | 11/1991 | Burt |
| 5,138,447 | A | 8/1992 | Shen et al. |
| 5,216,752 | A | 6/1993 | Tam |
| 5,216,757 | A | 6/1993 | Dorkin |
| 5,271,535 | A | 12/1993 | Fridman et al. |
| 5,272,535 | A | 12/1993 | Elabd |
| 5,355,435 | A | 10/1994 | DeYong et al. |
| 5,638,359 | A | 6/1997 | Peltola et al. |
| 5,652,594 | A | 7/1997 | Costas |
| 5,673,367 | A | 9/1997 | Buckley |
| 5,875,108 | A | 2/1999 | Hoffberg |

(Continued)

FOREIGN PATENT DOCUMENTS

| CN | 102226740 A | 10/2011 |
| JP | 4087423 | 3/1992 |

(Continued)

OTHER PUBLICATIONS

Branca, et al. (1995), A Neural Network for Ego-motion Estimation from Optical Flow, BMC'95 Proceedings of the 1995 British conference on machine vision (vol. 1), pp. 247-256.

(Continued)

*Primary Examiner* — Ishrat I Sherali
(74) *Attorney, Agent, or Firm* — Gazdzinski & Associates, PC

(57) ABSTRACT

Object recognition apparatus and methods useful for extracting information from sensory input. In one embodiment, the input signal is representative of an element of an image, and the extracted information is encoded in a pulsed output signal. The information is encoded in one variant as a pattern of pulse latencies relative to an occurrence of a temporal event; e.g., the appearance of a new visual frame or movement of the image. The pattern of pulses advantageously is substantially insensitive to such image parameters as size, position, and orientation, so the image identity can be readily decoded. The size, position, and rotation affect the timing of occurrence of the pattern relative to the event; hence, changing the image size or position will not change the pattern of relative pulse latencies but will shift it in time, e.g., will advance or delay its occurrence.

21 Claims, 8 Drawing Sheets

Fig.2

(56) References Cited

U.S. PATENT DOCUMENTS

| | | | |
|---|---|---|---|
| 5,997,539 A | 12/1999 | Errico et al. | |
| 6,009,418 A | 12/1999 | Cooper | |
| 6,014,653 A | 1/2000 | Thaler | |
| 6,035,389 A | 3/2000 | Grochowski | |
| 6,169,981 B1 | 1/2001 | Werbos | |
| 6,418,424 B1 | 7/2002 | Hoffberg et al. | |
| 6,458,157 B1 | 10/2002 | Suaning | |
| 6,509,854 B1 | 1/2003 | Morita | |
| 6,532,454 B1 | 3/2003 | Werbos | |
| 6,545,705 B1 | 4/2003 | Sigel et al. | |
| 6,545,708 B1 | 4/2003 | Tamayama | |
| 6,546,291 B2 | 4/2003 | Merfield et al. | |
| 6,581,046 B1 | 6/2003 | Ahissar | |
| 6,601,049 B1 | 7/2003 | Cooper | |
| 6,625,317 B1 | 9/2003 | Gaffin et al. | |
| 6,917,925 B2 | 7/2005 | Berenji et al. | |
| 7,054,850 B2* | 5/2006 | Matsugu | G06K 9/00973 706/20 |
| 7,565,203 B2 | 7/2009 | Greenberg et al. | |
| 7,580,907 B1 | 8/2009 | Rhodes | |
| 7,639,886 B1 | 12/2009 | Rastogi | |
| 7,653,255 B2 | 1/2010 | Rastogi | |
| 7,737,933 B2 | 6/2010 | Yamano et al. | |
| 7,765,029 B2 | 7/2010 | Fleischer et al. | |
| 7,849,030 B2 | 12/2010 | Ellingsworth | |
| 8,000,967 B2 | 8/2011 | Taleb | |
| 8,015,130 B2 | 9/2011 | Matsugu | |
| 8,103,602 B2 | 1/2012 | Izhikevich | |
| 8,154,436 B2 | 4/2012 | Szajnowski | |
| 8,160,354 B2 | 4/2012 | Paquier | |
| 8,200,593 B2 | 6/2012 | Guillen | |
| 8,281,997 B2 | 10/2012 | Moran et al. | |
| 8,311,965 B2 | 11/2012 | Breitwisch | |
| 8,315,305 B2* | 11/2012 | Petre | G06K 9/46 375/240.01 |
| 8,346,692 B2 | 1/2013 | Rouat et al. | |
| 8,390,707 B2 | 3/2013 | Yamashita | |
| 8,416,847 B2 | 4/2013 | Roman | |
| 8,467,623 B2 | 6/2013 | Izhikevich | |
| 8,515,160 B1 | 8/2013 | Khosla et al. | |
| 8,583,286 B2 | 11/2013 | Fleischer et al. | |
| 8,655,815 B2 | 2/2014 | Palmer et al. | |
| 8,712,939 B2 | 4/2014 | Szatmary et al. | |
| 8,712,941 B2 | 4/2014 | Izhikevich et al. | |
| 8,719,199 B2 | 5/2014 | Izhikevich et al. | |
| 8,725,658 B2 | 5/2014 | Izhikevich et al. | |
| 8,725,662 B2 | 5/2014 | Izhikevich et al. | |
| 8,756,183 B1 | 6/2014 | Daily et al. | |
| 8,775,341 B1 | 7/2014 | Commons | |
| 8,793,205 B1 | 7/2014 | Fisher et al. | |
| 8,817,094 B1 | 8/2014 | Brown et al. | |
| 8,942,466 B2* | 1/2015 | Petre | G06K 9/6232 375/E7.001 |
| 8,943,008 B2 | 1/2015 | Ponulak et al. | |
| 8,972,315 B2 | 3/2015 | Szatmary et al. | |
| 8,977,582 B2* | 3/2015 | Richert | G06K 9/62 382/156 |
| 8,983,216 B2* | 3/2015 | Izhikevich | G06K 9/46 382/236 |
| 8,990,133 B1 | 3/2015 | Ponulak et al. | |
| 8,996,177 B2 | 3/2015 | Coenen | |
| 2002/0038294 A1 | 3/2002 | Matsugu | |
| 2003/0050903 A1 | 3/2003 | Liaw | |
| 2003/0216919 A1 | 11/2003 | Roushar | |
| 2003/0222987 A1 | 12/2003 | Karazuba | |
| 2004/0054964 A1 | 3/2004 | Bozdagi et al. | |
| 2004/0064609 A1 | 4/2004 | Sanma et al. | |
| 2004/0066363 A1 | 4/2004 | Yamano et al. | |
| 2004/0136439 A1 | 7/2004 | Dewberry | |
| 2004/0170330 A1 | 9/2004 | Fogg | |
| 2004/0193670 A1 | 9/2004 | Langan et al. | |
| 2004/0220082 A1 | 11/2004 | Surmeier et al. | |
| 2005/0015351 A1 | 1/2005 | Nugent | |
| 2005/0036649 A1 | 2/2005 | Yokono et al. | |
| 2005/0096539 A1 | 5/2005 | Leibig et al. | |
| 2005/0261803 A1 | 11/2005 | Seth et al. | |
| 2005/0271289 A1 | 12/2005 | Rastogi | |
| 2005/0283450 A1 | 12/2005 | Matsugu | |
| 2006/0094001 A1 | 5/2006 | Torre | |
| 2006/0129728 A1 | 6/2006 | Hampel | |
| 2006/0161218 A1 | 7/2006 | Danilov | |
| 2007/0022068 A1 | 1/2007 | Linsker | |
| 2007/0176643 A1 | 8/2007 | Nugent | |
| 2007/0208678 A1 | 9/2007 | Matsugu | |
| 2008/0024345 A1 | 1/2008 | Watson | |
| 2008/0100482 A1 | 5/2008 | Lazar | |
| 2008/0162391 A1 | 7/2008 | Izhikevich | |
| 2008/0174700 A1 | 7/2008 | Takaba | |
| 2008/0199072 A1 | 8/2008 | Kondo | |
| 2008/0201282 A1 | 8/2008 | Garcia et al. | |
| 2008/0237446 A1 | 10/2008 | Oshikubo | |
| 2008/0316362 A1 | 12/2008 | Qiu et al. | |
| 2009/0043722 A1 | 2/2009 | Nugent | |
| 2009/0043777 A1 | 2/2009 | Wyler et al. | |
| 2009/0287624 A1 | 11/2009 | Rouat et al. | |
| 2010/0036457 A1 | 2/2010 | Sarpeshkar | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0198765 A1 | 8/2010 | Fiorillo | |
| 2010/0225824 A1 | 9/2010 | Lazar | |
| 2010/0235310 A1 | 9/2010 | Gage et al. | |
| 2010/0299296 A1 | 11/2010 | Modha et al. | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0134242 A1 | 6/2011 | Loubser et al. | |
| 2011/0137843 A1 | 6/2011 | Poon et al. | |
| 2011/0160741 A1 | 6/2011 | Asano | |
| 2011/0184556 A1 | 7/2011 | Seth et al. | |
| 2011/0206122 A1 | 8/2011 | Lu et al. | |
| 2011/0235698 A1 | 9/2011 | Petre et al. | |
| 2012/0011090 A1 | 1/2012 | Tang | |
| 2012/0011093 A1 | 1/2012 | Aparin et al. | |
| 2012/0036099 A1 | 2/2012 | Venkatraman et al. | |
| 2012/0083982 A1 | 4/2012 | Bonefas | |
| 2012/0084240 A1 | 4/2012 | Esser et al. | |
| 2012/0109863 A1 | 5/2012 | Esser et al. | |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2012/0330872 A1 | 12/2012 | Esser et al. | |
| 2013/0019325 A1 | 1/2013 | Deisseroth et al. | |
| 2013/0046716 A1 | 2/2013 | Chan et al. | |
| 2013/0073080 A1 | 3/2013 | Ponulak | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073493 A1 | 3/2013 | Modha | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0103626 A1 | 4/2013 | Hunzinger | |
| 2013/0117212 A1 | 5/2013 | Hunzinger et al. | |
| 2013/0151450 A1 | 6/2013 | Ponulak | |
| 2013/0204814 A1 | 8/2013 | Hunzinger et al. | |
| 2013/0204820 A1 | 8/2013 | Hunzinger et al. | |
| 2013/0218821 A1 | 8/2013 | Szatmary | |
| 2013/0251278 A1 | 9/2013 | Izhikevich | |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0304683 A1 | 11/2013 | Lo | |
| 2013/0325766 A1 | 12/2013 | Petre et al. | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325777 A1 | 12/2013 | Petre et al. | |
| 2014/0012788 A1 | 1/2014 | Piekniewski | |

(56) References Cited

U.S. PATENT DOCUMENTS

| | | | |
|---|---|---|---|
| 2014/0016858 A1 | 1/2014 | Richert | |
| 2014/0025613 A1 | 1/2014 | Ponulak | |
| 2014/0032458 A1 | 1/2014 | Sinyavskiy | |
| 2014/0032459 A1 | 1/2014 | Sinyavskiy | |
| 2014/0052679 A1 | 2/2014 | Sinyavskiy | |
| 2014/0064609 A1 | 3/2014 | Petre et al. | |
| 2014/0122397 A1 | 5/2014 | Richert | |
| 2014/0122398 A1 | 5/2014 | Richert | |
| 2014/0122399 A1 | 5/2014 | Szatmary | |
| 2014/0122400 A1 | 5/2014 | Szatmary et al. | |
| 2014/0156574 A1 | 6/2014 | Piekniewski | |
| 2014/0193066 A1 | 7/2014 | Richert | |
| 2014/0310220 A1 | 10/2014 | Chang et al. | |
| 2014/0379623 A1 | 12/2014 | Piekniewski | |
| 2015/0005937 A1 | 1/2015 | Ponulak | |
| 2015/0120626 A1 | 4/2015 | Gupta et al. | |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Aleksandrov, et al. (1968), Stochastic optimization, Engineering Cybernetics, 5, 11-16.

Amari, et al. (1998), Why natural gradient?, Acoustics, Speech and Signal Processing, (pp. 1213-1216), Seattle, WA, USA.

Baras, D., et al., "Reinforcement learning, Spike-Time-Dependent Plasticity, and the BCM rule", Neural Computation, vol. 19, No. 8 (2007): pp. 2245-2279.

Bartlett et al., (2000) "A Biologically Plausible and Locally Optimal Learning Algorithm for Spiking Neurons" Retrieved from http://arp.anu.edu.au/ftp/papers/jon/brains.pdf.

Baxter et al., (2000), Direct gradient-based reinforcement learning, in Proceedings of the International Symposium on Circuits and Systems, (pp. III-271-274).

Bennett, M.R., (1999), The early history of the synapse: from Plato to Sherrington, Brain Res. Bull., 50(2): 95-118.

Bertsekas, Dimitri P., Dynamic programming and optimal control. vol. No. 2. Belmont, MA: Athena Scientific, 1995.

Bertsekas, Dimitri P. (2011), "Chapter 6: Approximate dynamic programming".

Blais, B.S., et al., "BCM Theory", Scholarpedia, 2008, vol. 3 (3), 13 pages.

Bohte, et al. (2000), SpikeProp: backpropagation for networks of spiking neurons, In Proceedings of ESANN2000, (pp. 419-424).

Bohte, et al. (2004), "A Computational Theory of Spike-Timing Dependent Plasticity: Achieving Robust Neural Responses via Conditional Entropy Minimization".

Booij, et al. (2005), A Gradient Descent Rule for Spiking Neurons Emitting Multiple Spikes, Information Processing Letters n. 6. v.95, 552-558.

Breiman, "Random Forests", Statistics Dept, University of California, Berkley, 33 pgs, Jan. 2001.

Capel, "Random Forests and Ferns", LPAC, Jan. 1, 2012, 40 pgs.

Chistiakova, Marina, et al., "Heterosynaptic plasticity in the neocortex." Experimental brain research 199.3-4 (2009): 377-390.

Panchev, Christo, "Temporal Processing in a Spiking Model of the Visual System", S. Kollias et al. (Eds.): ICANN 2006, Part 1, LNCS 4131, Springer-Verlag, Berlin, 2006, pp. 750-759.

Ruan, Chengmei, et al., Competitive behaviors of a spiking neural network with spike timing dependent plasticity, Biomedical Engineering and Informatics (BMEI), 2012 5th International Conference on DOI: 10.1109/BMEI.2012.6513088 Publication Year: 2012, pp. 1015-1019.

Dan, Y., et al., "Spike Timing-dependent Plasticity of Neural Circuits," Neuron, 2004, vol. 44 (1), pp. 23-30.

De Queiroz, M., et al., "Reinforcement learning of a simple control task using the spike response model", Neurocomputing, vol. 70(2006): pp. 14-20.

El-Laithy, et al. (2011), A Reinforcement Learning Framework for Spiking Networks with Dynamic Synapses, Comput. Intell. Neurosci., vol. 2011, Article ID 869348.

Fletcher (1987), Practical Methods of Optimization, $2^{nd}$ Ed., New York, NY: Wiley-Interscience.

Florian (2005), A reinforcement learning algorithm for spiking neural networks, SYNASC '05 Proceedings of the Seventh International Symposium on Symbolic and Numeric Algorithms for Scientific Computing.

Florian (2003), Biologically Inspired Neural Networks for the Control of Embodied Agents, Technical Report Coneural-03-03 Version 1.0, Nov. 30, 2003.

Fremaux, N., et al., "Functional Requirements for Reward-Modulated Spike-Timing-Dependent Plasticity", The Journal of Neuroscience, Oct. 6, 2010, 30 (40):13326-13337.

Fu (2005), Technical Research Report, Stochastic Gradient Estimation,, Institute for Systems Research.

Fu (2008), What You Should Know About Simulation and Derivatives, Naval Research Logistics, vol. 55, No. 8, 723-736.

Fyfe, et al.(2007), Reinforcement Learning Reward Functions for Unsupervised Learning, ISNN: 4th International Symposium on Neural Networks: Advances in Neural Networks.

Gerstner, et al. (2002), "Spiking neuron models: single neurons, populations, plasticity", Cambridge, U.K.: Cambridge University Press.

Glackin, C., et al., Feature Extraction from Spectro-temporal Signals using Dynamic Synapses, Recurrency, and Lateral Inhibition, Neural Networks (IJCNN), The 2010 International Joint Conference on DOI: 10.1109/IJCNN.2010.5596818 Publication Year: 2010, pp. 1-6.

Glynn, et al., (1995), Likelihood ratio gradient estimation for stochastic recursions Advances in Applied Probability 27, 1019-1053.

Govindhasamy, James J., et al., "Sequential learning for adaptive critic design: An industrial control application" Machine Learning for Signal Processing, 2005 IEEE Workshop on. IEEE, 2005.

Hagras, Hani, et al., "Evolving Spiking Neural Network Controllers for Autonomous Robots", IEEE 2004.

Hanselmann, T., et al., "Continuous-time Adaptive Critics," IEEE Transactions on Neural Networks, 2007, vol. 18 (3), pp. 631-647.

Ho, "Random Decision Forests" Int'l Conf. Document Analysis and Recognition, 1995, 5 pgs.

Huang, et al., Fall Detection Using Modular Neural Networks with Back-projected Optical Flow, Published 2007.

In search of the artificial retina, Vision Systems Design, vol. 12(4) Apr. 1, 2007, retrieved from the Internet: www.vision-systems.com.

Itti, Laurent, et al., "Computational modeling of visual attention", Nature Reviews, Neuroscience 23 (2001): 194-203.

Izhikevich, E. (2007), Solving the Distal Reward Problem through Linkage of STDP and Dopamine Signaling, Cerebral Cortex, vol. 17, 2443-2452.

Izhikevich, Eugene M., Dynamical systems in neuroscience: chapters 1 and 2, MIT press, 2007.

Kaelbling, Leslie, et al., "Reinforcement Learning: A Survey" Journal of Artificial Intelligence Research 4 ((1996): 237-285.

Kalal, et al., "Online learning of robust object detectors during unstable tracking" published on 3rd On-line Learning for Computer Vision Workshop 2009, Kyoto, Japan, IEEE CS.

Kasabov, "Evolving Spiking Neural Networks for Spatio-and Spectro-Temporal Pattern Recognition", IEEE 6th International Conference Intelligent Systems 2012 ], Retrieved Jun. 24, 2014 from the Internet: http://ncs.ethz.ch/projects/evospike/publications/evolving-spiking-neural-networks-for-spatio-and-spectro-temporal-pattern-recognition-plenary-talk-ieee-is/view.

Doya, Kenji (2000), Reinforcement Learning in Continuous Time and Space, Neural Computation, 12(1): 219-245.

Kiefer, et al.(1952), Stochastic Estimation of the Maximum of a Regression Function, Annals of Mathematical Statistics, vol. 23(3): 462-466.

Klampfl, et al (2009), Spiking neurons can learn to solve information bottleneck problems and extract independent components, Neural Computation, 21(4), pp. 911-959.

(56) References Cited

OTHER PUBLICATIONS

Kleijnen, et al., Optimization and sensitivity analysis of computer simulation models by the score function method, European Journal of Operational Research, Mar. 1995.
Klute, et al., "Artificial Muscles: Actuators for Biorobotic Systems," The International Journal of Robotics Research, 2002, vol. 21, pp. 295-309.
Knoblauch A., et al., "Memory Capacities for Synaptic and Structural Plasticity," Neural Computation, 2010, vol. 22 (2), pp. 289-341.
Larochelle, et al. (2009), Exploring Strategies for Training Deep Neural Networks, J. of Machine Learning Research, v. 10, pp. 1-40.
Buesing, Lars, et al., "Simplified Rules and Theoretical Analysis for Information Bottleneck Optimization and PCA with Spiking Neurons", NIPS Proceedings, 2007, http://papers.nips.cc/paper/3168-simplified-rules-and-theoretical-analysis-forinformation-bottleneck-optimization-and-pea-with-spiking-neurons, pp. 1-8
Lazar, et al., "Consistent recovery of sensory stimuli encoded with MIMO neural circuits," Computational Intelligence and Neuroscience, 2009.
Legenstein, R., et al. (2008), A learning theory for reward-modulated spike-timing dependent plasticity with application to biofeedback, PLoS Computational Biology, 4(10): 1-27.
Lendek, et al. (2006), State Estimation under Uncertainty-. A Survey: 'Technical report 06-004 Delft Center for Systems and Control, Delft University of Technology.
Leydesdorff, L., et al., "Classification and Powerlaws: The Logarithmic Transformation, Journal of the American Society for Information Science and Technology (forthcoming)", 2006.
Li, Zhaoping (2002), "A saliency map in primary visual cortex", Trends in Cognitive Sciences, vol. 6(1): 9-16.
Lin, Long-Ji, "Self-improving reactive agents based on reinforcement learning, planning and teaching," Machine Learning 8:3-4 (1992): 293-321.
Long, Lyle N., et al., "Biologically-Inspired Spiking Neural Networks with Hebbian Learning for Vision Processing", AIAA Paper No. 2008-0885, presented at AIAA 46th Aerospace Sciences Meeting, Reno, NV, Jan. 2008, pp. 1-17.
Markram, Henry, et al., "Regulation of synaptic efficacy by coincidence of postsynaptic APs and EPSPs.", Science 275.5297 (1997): 213-215.
Matsugy, Masakazu, et al., "Convolutional Spiking Neural Network Model for Robust Face Detection", Proceedings of the 9th International Conference on Neural Information Processing (ICONIP'02), vol. 2, 2002, pp. 660-664.
Medini, C., et al., Modeling Cerebellar Granular Layer Excitability and Combinatorial Computation with Spikes, Bio-Inspired Computing: Theories and Applications (BIC-TA), 2010 IEEE Fifth International Conference on DOI: 10.1 109/BICTA.201 0.5645274, Publication Year: 2010, pp. 1495-1503.
Meinhardt, Hans, et al., "Pattern formation by local self-activation and lateral inhibition" Bioessays 22.8 (2000): 753-760.
Venkateswaran, et al., "A Novel Perspective into the Neuronal Encoding Along the Retinal Pathway Employing Time-Frequency Transformation: Part II-For Color", Brain Inspired Cognitive Systems, 2004, pp. 1-7.
Caporale, Natalie, et al., "Spike Timing-Dependent Plasticity: a Hebbian Learning Rule," Annual Review of Neuroscience, 2008, vol. 31, pp. 25-46.
Nikolic, K., et al. (2011), High-sensitivity silicon retina for robotics and prosthetics.
Niv, et al., Evolution of Reinforcement Learning in Uncertain Environments: A Simple Explanation for Complex Foraging Behaviors, International Society for Adaptive Behavior, 2002, vol. 10(1), pp. 5-24.
Oja, Erkki (2008), Scholarpedia, "Oja learning rule".
Ojala, et al., "Performance Evaluation of Texture Measures with Classification Based on Kullback Discrimination of Distributions", 1994 IEEE, pp. 582-585.
Ostojic, et al., From Spiking Neuron Models to Linear-Nonlinear Models, Jan. 2011, vol. 7 (1), e1001056.
Ozuysal, et al., "Fast Keypoint Recognition in Ten Lines of Code", CVPR 2007.
Ozuysal, et al., "Fast Keypoint Recognition Using Random Ferns" IEEE Transactions on Pattern Analysis and Machine Intelligence, vol. 32 No. 3, Mar. 2010, pp. 448-461.
Paugam-Moisy, et al., "Computing with Spiking Neuron Networks", Handbook of Natural Computing, 40 pages, Springer, Heidelberg (2009).
Werbos, P.J. (1992), Neurocontrol and Fuzzy Logic: Connections and Designs, International Journal of Approximate Reasoning, vol. 6(2): 185-219.
Pfister, et al. (2003), Optimal Hebbian Learning: A Probabilistic Point of View, ICANN Proceedings, Springer, pp. 92-98.
Pfister, et al. (2006), Optimal Spike-Timing Dependent Plasticity for Precise Action Potential Firing in Supervised Learning, Neural Computation Issn 0899-7667, 18:1318-1348.
Morrison, Abigail, et al., Phenomenological models of synaptic plasticity based on spike timing, Biol Cybern (2008) 98:459-478, DOI 10.1007/s00422-008-0233-1.
Ponulak, "Analysis of the Resume Learning Process for Spiking Neural Networks," International Journal of Applied Mathematics & Computer Science, 2008, vol. 18 (2), pp. 117-127.
Ponulak, F., (2005), ReSuMe—New Supervised Learning Method for Spiking Neural Networks. Technical Report, Institute of Control and Information Engineering, Poznan University of Technology.
Ponulak, F., et al., Supervised learning in spiking neural networks with ReSuMe: sequence learning, classification, and spike shifting, Neural Comp, 22(2): 467-510.
Prokhorov, Danil V., et al., "Primitive Adaptive Critics" Neural Networks, Conference Paper, Jul. 1997, DOI:10.1109/ICNN.1997.614396.
Wu, QingXiang, et al., Edge Detection Based on Spiking Neural Network Model, ICIC 2007, LNAI 4682, pp. 26-34, 2007, Springer-Verlag, Berlin Heidelberg.
Serrano-Gotarredona, Rafael, et al., "A Neuromorphic Cortical-Layer Microchip for Spike-Based Event Processing Vision Systems", Circuits and Systems 1: Regular Papers, IEEE Transactions on (vol. 53, Issue: 12), Dec. 12, 2006, pp. 2548-2566.
Vislay-Meltzer, Rebecca L., et al., "Spatiotemporal Specificity of Neuronal Activity Directs the Modification of Receptive Fields in the Developing Retinotectal System", Neuron 50, Apr. 6, 2006, pp. 101-114.
Reiman, et al. (1989), Sensitivity analysis for simulations via likelihood ratios, Oper Res 37(5): 830-844.
D'Cruz, Brendan, Reinforcement Learning in Intelligent Control: A Biologically-Inspired Approach to the Relearning Problem, thesis submitted to the University of Plymouth, May (1998).
Florian, Razvan V., Reinforcement Learning Through Modulation of Spike-Timing-Dependent Synaptic Plasticity, Neural Computation 19, 1468-1502 (2007), Massachusetts Institute of Technology.
Rekeczky, et al., "Cellular Multiadaptive Analogic Architecture: A Computational Framework for UAV Applications", May 2004.
Robbins, et al. (1951), A Stochastic Approximation Method, Annals of Mathematical Statistics 22, #3, 400-407.
Rosenstein, et al. (2002), Supervised learning combined with an actor-critic architecture, Technical Report 02-41, Department of Computer Science, University of Massachusetts, Amherst.
Rumelhart, et al., (1986), Chapter 8: Learning Internal Representations by Error Propagation, Parallel Distributed Processing, vol. 1 (pp. 318-362), Cambridge, MA: MIT Press.
Rumelhart, et al. (1986), Learning representations by back-propagating errors, Nature 323 (6088), pp. 533-536.
Schrauwen, et al., "Improving SpikeProp: Enhancements to an Error-Backpropagation Rule for Spiking Neural Networks", ProsRISC Workshop, 2004, pp. 301-305.
Schreiber, S., et al., "A New Correlation-based Measure of Spike Timing Reliability," Neurocomputing, 2003, vol. 52-54, pp. 925-931.
Seung, H. (2003), "Learning in spiking neural networks by reinforcement of stochastic synaptic transmission" Neuron, vol. 40(6): pp. 1063-1073.
Sinyavskiy, et al. (2010), Generalized Stochastic Spiking Neuron Model and Extended Spike Response Model in Spatial-Temporal

(56) References Cited

OTHER PUBLICATIONS

Impulse Pattern Detection Task Optical Memory and Neural Networks (Information Optics) 2010, vol. 19 No. 4 pp. 300-309.

Sinyavskiy O.Yu., "Obuchenic s Podkrepleniem Spaikovoy Neiroiniy Seti v Zadache Upravleniya Agentom v Diskretnoy Virtualnoy Srede" Nelineinaya Dinamika, vol. 7 (24), 2011, pp. 859-875.

Steele, P.M., et al., "Inhibitory Control of LTP and LTD: Stability of Synapse Strength," Journal of Neurophysiology, 1999, vol. 81 (4), pp. 1559-1566.

Stein, R.B. (1967), Some models of neural variability, Biophys. J. 7: 37-68.

Ponulak, Filip, Supervised Learning in Spiking Neural Networks with ReSuMe Method, doctoral dissertation, Poznan, Poland 2006.

Sutton, R.S. (1988), Learning to predict by the methods of temporal differences, Machine Learning 3(1), 9-44.

Wade, J.J., et al., SWAT: A Spiking Neural Network Training Algorithm for Classification Problems, Neural Networks, IEEE Transactions on vol. 21, Issue: 11 DOI: 10.1109/TNN.2010.2074212 Publication Year: 2010, pp. 1817-1830.

Swiercz, Waldemar, et al. (2006), "A New Synaptic Plasticity Rule for Networks of Spiking Neurons.", IEEE Transactions on Neural Networks 17(1): 94-105.

Tegner, J., et al., "An Adaptive Spike-Timing-Dependent Plasticity Rule", Elsevier Science B.V., 2002.

Thorpe, S., Neurons and Features Chapter: Ultra-Rapid Scene Categorization with a Wave of Spikes,, Biologically Motivated Computer Vision, Lecture Notes in Computer Science, 2002, 2525, pp. 1-15, Springer-Verlag, Berlin.

Masquelier, Timothee, "Learning Mechanisms to Account for the Speed, Selectivity and Invariance of Responses in the Visual Cortex", PhD thesis published by Universite Toulouse III-Paul Sabatier, U.F.R. Sciences de la Vie et de la Terre, Feb. 15, 2008, pp. 1-192.

Tishby, et al. (1999), The Information Bottleneck Method, Proceedings of the 37th Annual Allerton Conference on Communication, Control and Computing, Hajek & Sreenivas, eds., pp. 368-377, University of Illinois.

Toyoizumi, et al. (2007), Optimality Model of Unsupervised Spike-Timing Dependent Plasticity: Synaptic Memory and Weight Distribution, Neural Computation, 19 (3).

Toyoizumi, et al. (2005), Generalized Bienenstock-Cooper-Munro rule for spiking neurons that maximizes information transmission, Proc. Natl. Acad. Sci. USA, 102, (pp. 5239-5244).

Vasilaki, et al., "Learning flexible sensori-motor mappings in a complex network" Biol Cybern (2009) 100:147-158.

Vasilaki, et al., "Spike-Based Reinforcement Learning in Continuous State and Action Space: When Policy Gradient Methods Fail" PLoS, vol. 5, Issue 12, Dec. 2009.

Hatsopoulos, et al. (1991), Visual Navigation with a Neural Network, Neural Networks, 4:303-317.

Voutsas, K., et al., A Biologically Inspired Spiking Neural Network for Sound Source Lateralization Neural Networks, IEEE Transactions on vol. 18, Issue: 6 DOI: 10.11 09/TNN.2007.899623, Publication Year: 2007, pp. 1785-1799.

Wang, R., et al., A programmable axonal propagation delay circuit for time-delay spiking neural networks, Circuits and System (ISCAS), 2011 IEEE International Symposium on. May 15-18, 2011, pp. 869-872 [retrieved on Nov. 13, 2013 fromieeexplore.ieee.org].

Weaver, et al. (2001), The Optimal Reward Baseline for Gradient-Based Reinforcement Learning, UA1 01 Proceedings of the 17th Conference in Uncertainty in Artificial Intelligence (pp. 583-545), Morgan Kaufman Publishers.

Weber, C., et al., 'Robot docking with neural vision and reinforcement', Knowledge-Based Systems, vol. 17 No. 2 (2004): pp. 165-172.

Weber, et al., (2009), Goal-Directed Feature Learning, Proc. of International Joint Conference on Neural Networks, Atlanta, Georgia, pp. 3319 3326.

Wennekers, T., Analysis of Spatio-temporal Patterns in Associative Networks of Spiking Neurons, Artificial Neural Networks, 1999, ICANN 99, Ninth International Conference (Conf. Publ. No. 470) vol. 1 DOI:10.1049/cp:I9991116 Publication Year: 1999, vol. 1, pp. 245-250.

Prokhorov, D.V., et al.(1997), Adaptive Critic Designs, IEEE Trans Neural Networks, vol. 8. No. 5, pp. 997-1007.

White, D. A., et al. (Eds.) (1992), Handbook of Intelligent Control; Neural, Fuzzy, and Adaptive Approaches, Van Nostrand Reinhold, New York.

Widrow, et al. (1960), Adaptive Switching Circuits, IRE WESCON Convention Record 4: 96-104.

Widrow, Bernard, et al., "Punish/Reward: Learning with a Critic in Adaptive Threshold Systems", IEEE Transactions on Systems, Man and Cybernetics, vol. SMC-3, No. 5 (1973): 455-465.

Williams (1992), Simple Statistical Gradient-Following Algorithms for Connectionist Reinforcement Learning, Machine Learning 8, 229-256.

Wohns, R.N.W., et al., Day Surgery for Anterior Cervical Microdiskectomy: Experience with 75 Cases, Jul. 11, 2002, pp. 1-3.

Wu, QingXiang, et al., "Remembering Key Features of Visual Images based on Spike Timing Dependent Plasticity of Spiking Neurons" 2nd International Congress on Image and Signal Processing (CISP 2009), „IEEE, 2009.

Wysoski, et al., "Fast and Adaptive Network of Spiking Neuron for Multi-view Visual Pattern Recognition", May 3, 2008, Elsevier, Neurocomputing vol. 71, pp. 2563-2575.

Xie, Xiaohui, et al., "Learning in neural networks by reinforcement of irregular spiking", Physical Review E. vol. 69, letter 041909, 2004, pp. 1-10.

Yang, Z., et al., "A Neuromorphic Depth-from-motion Vision Model with STDP Adaptation," IEEE Transactions on Neural Networks, 2006, vol. 17 (2), pp. 482-495.

Yi, et al. (2009), Stochastic Search using the Natural Gradient, ICML '09 Proceedings of the 26th Annual International Conference on Machine Learning, New York, NY, USA.

Zhou, Computation of Optical Flow Using a Neural Network, Published 1988.

Berkes and Wiskott, Slow feature analysis yields a rich repertoire of complex cell properties. *Journal of Vision* (2005) vol. 5 (6).

Bohte, 'Spiking Nueral Networks' Doctorate at the University of Leiden, Holland, Mar. 5, 2003, pp. 1-133 [retrieved on Nov. 11, 2014]. Retrieved from the internet: <URL: http://holnepagcs,cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland et al., 'Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Field, G.; Chichilnisky, E., Information Processing in the Primate Retina: Circuitry and Coding. *Annual Review of Neuroscience*, 2007, 30(1), 1-30.

Fiete, et al., Spike-Time-Dependent Plasticity and Heterosynaptic Competition Organize Networks to Produce Long Scale-Free Sequences of Neural Activity, *Neuron 65*, Feb. 25, 2010, pp. 563-576.

Floreano et al., 'Neuroevolution: from architectures to learning' Evol. Intel. Jan. 2008 1:47-62, [retrieved Dec. 30, 2013] [retrieved

(56) References Cited

OTHER PUBLICATIONS online from URL:<http://inforscience.epfl.ch/record/112676/files/FloreanoDuerrMattiussi2008.p df>.

Földiák, P., Learning invariance from transformation sequences. *Neural Computation*, 1991, 3(2), 194-200.

Froemke et al., 'Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Gerstner et al. (1996) A neuronal learning rule for sub-millisecond temporal coding. *Nature* vol. 383 (6595) pp. 76-78.

Gewaltig et al., 'Nest (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.com/url?sa=t&rct=j&q=Giuck+%22STIMULUS+GENERALIZATION+AND+REPRESENTATION+1 N +ADAPTIVE+NETWORK+MODELS+OF+CATEGORY+LEARN I NG%22+ 1991.

Gollisch et al. 'Rapid neural coding in the retina with relative spike latencies.' Science 319.5866 (2008): 11 08-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098.

Graham, Lyle J., The Surf-Hippo Reference Manual, http:// www.neurophys.biomedicale.univparis5. fr/- graham/surf-hippo-files/Surf-Hippo%20Reference%20Manual.pdf, Mar. 2002, pp. 1-128.

Hopfield JJ (1995) Pattern recognition computation using action potential timing for stimulus representation. *Nature* 376: 33-36.

Izhikevich E. M. And Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*,18:245-282.

Izhikevich et al., 'Relating STDP to BCM', Neural Computation (2003) 15, 1511-1523.

Izhikevich, E.M. (2007) Dynamical Systems in Neuroscience: The Geometry of Excitability and Bursting, *The MIT Press*, 2007.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. *Network, Computation in Neural Systems*, 2006, 17 (1), 31-41.

Karbowski et al., 'Multispikes and Synchronization in a Large Neural Network with Temporal Delays', Neural Computation 12, 1573-1606 (2000).

Khotanzad, Alireza, Classification of invariant image representations using a neural network, IEEF. Transactions on Acoustics, Speech, and Signal Processing vol. 38 No. 6 Jun. 1990 pp. 1028-1038.

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Knoblauch, et al. Memory Capacities for Synaptic and Structural Plasticity, *Neural Computation* 2009, pp. 1-45.

Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/nnql/issues/detail?id=1>.

Lazar et al. 'A video time encoding machine', in Proceedings of the 15th IEEE International Conference on Image Processing (ICIP '08}, 2008, pp. 717-720.

Lazar et al.,'Consistent recovery of sensory stimuli encoded with MIMO neural circuits.' Computational intelligence and neuroscience (2010): 2.

Lazar et al. 'Multichannel time encoding with integrate-and-fire neurons.' Neurocomputing 65 (2005): 401-407.

Masquelier and Thorpe, Learning to recognize objects using waves of spikes and Spike Timing-Dependent Plasticity. *Neural Networks* (IJCNN), The 2010 International Joint Conference on DOI—10.1109/1JCNN.2010.5596934 (2010) pp. 1-8.

Masquelier, Timothee. 'Relative spike time coding and STOP-based orientation selectivity in the early visual system in natural continuous and saccadic vision: a computational model.' Journal of computational neuroscience 32.3 (2012): 425-441.

Meister, M., Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Nichols, A Re configurable Computing Architecture for Implementing Artificial Neural Networks on FPGA, Master's Thesis, The University of Guelph, 2003, pp. 1-235.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Paugam-Moisy et al. 'Computing with spiking neuron networks.' Handbook of Natural Computing, 40 p. Springer, Heidelberg (2009).

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL:http://citeseerx.ist.psu.edu/viewdoc/download?doi=10.1.1.5.4346&rep=rep1&type=pdf.

Rekeczky, et al., "Cellular Multiadaptive Analogic Architecture: A Computational Framework for UAV Applications," May 2004.

Revow M., Williams C., and Hinton, G.E., 1996, Using Generative Models for Handwritten Digit Recognition, *IEEE Trans. On Pattern Analysis and Machine Intelligence*, 18, No. 6, Jun. 1996.

Sanchez, Efficient Simulation Scheme for Spiking Neural Networks, *Doctoral Thesis, Universita di Granada* Mar. 28, 2008, pp. 1-104.

Sato et al., 'Pulse interval and width modulation for video transmission.' Cable Television, IEEE Transactions on 4 (1978): 165-173.

Schemmel, J., et al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain. *Neuron*, 2003, 37, 499-511.

Serrano-Gotarredona, et al, "On Real-Time: AER 2-D Convolutions Hardware for Neuromorphic Spike-based Cortical Processing", Jul. 2008.

Simulink.RTM. model [online], [Retrieved on Dec. 10, 2013] Retrieved from <URL:http://www.mathworks.com/ products/simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al., 'Spike-timing Theory of Working Memory' PLoS Computational Biology, vol. 6, Issue 8, Aug. 19, 2010 [retrieved on

(56) References Cited

OTHER PUBLICATIONS

Dec. 30, 2013]. Retrieved from the Internet: <URL:http://www.ploscompbiol.org/article/info%3Adoi%2F10.1371%2Fjournal.pcbi.10008 79#>.

Thomas S. and Riesenhuber, M, 2004, Realistic Modeling of Simple and Complex Cell Tuning in the HMAX Model, and Implications for Invariant Object Recognition in Cortex, *Al Memo* 2004—Jul. 17, 2004.

Thorpe, S.J., Delorme, A. & Vanrullen, R. (2001). Spike-based strategies for rapid processing. *Neural Networks* 14, pp. 715-725.

Thorpe, S.J., Guyonneau, R., Guilbaud, N., Allegraud, J-M. & Vanrullen, R. (2004). SpikeNet: real-time visual processing with one spike per neuron. *Neurocomputing*, 58-60, pp. 857-864.

Tim Gollisch and Markus Meister (2008) Rapid Neural Coding in the Retina with Relative Spike Latencies. *Science* 319:1108-1111.

Van Rullen R.; Thorpe, S. Rate Coding versus temporal order coding: What the Retinal ganglion cells tell the visual cortex. *Neural computation*, 2001, 13, 1255-1283.

Vanrullen, R. & Koch, C. (2003). Is perception discrete or continuous? *Trends in Cognitive Sciences* 7(5), pp. 207-213.

Vanrullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wang, 'The time dimension for scene analysis.' Neural Networks, IEEE Transactions on 16.6 (2005): 1401-1426.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

Stringer, et al., "Invariant Object Recognition in the Visual System with Novel Views of 3D Objects", 2002, 2585-2596, 12 pages.

Wiskott, et al., "Slow Feature Analysis", 2002, 29 pages.

Ramachandran, et al., "The Perception of Phantom Limbs", The D.O. Hebb Lecture, Center for Brain and Cognition, University of California, 1998, 121, 1603-1630, 28 pages.

Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.

Izhikevich E.M., "Neural Excitability, Spiking and Bursting", Neurosciences Institute, Received Jun. 9, 1999, Revised Oct. 25, 1999, 1171-1266, 96 pages.

Kazantsev, et al., "Active Spike Transmission in the Neuron Model With a Winding Threshold Maniford", Jan. 3, 2012, 205-211, 7 pages.

Kling-Petersen, PhD, "Sun and HPC: From Systems to PetaScale" Sun Microsystems, no date, 31 pages.

Martinez-Perez, et al., "Automatic Activity Estimation Based on Object Behavior Signature", 2010, 10 pages.

Matsugu, et al., "Convolutional Spiking Neural Network for Robust Object Detection with Population Code Using Structured Pulse Packets", 2004, 39-55, 17 pages.

\* cited by examiner

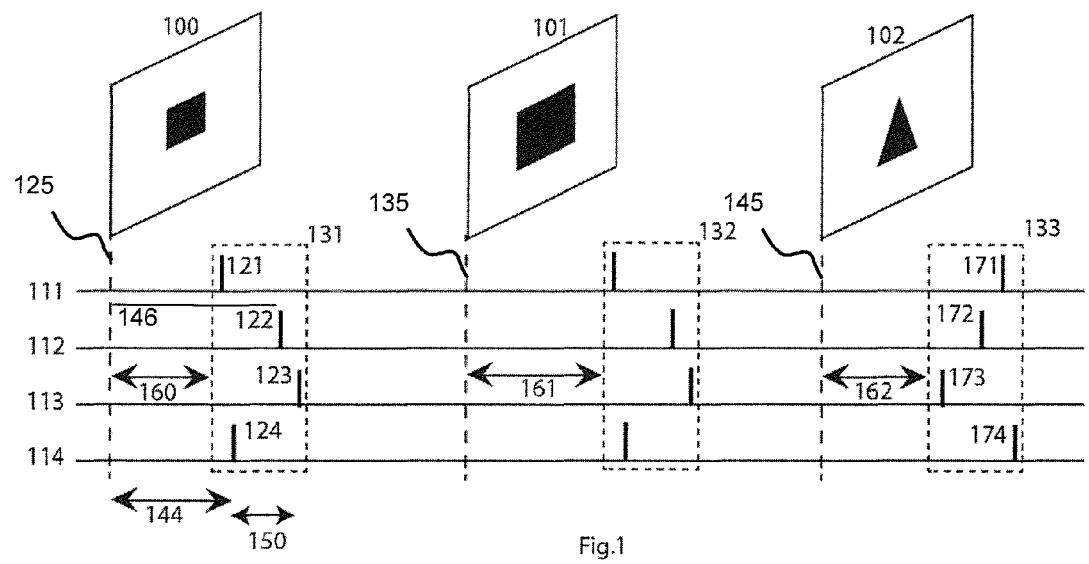
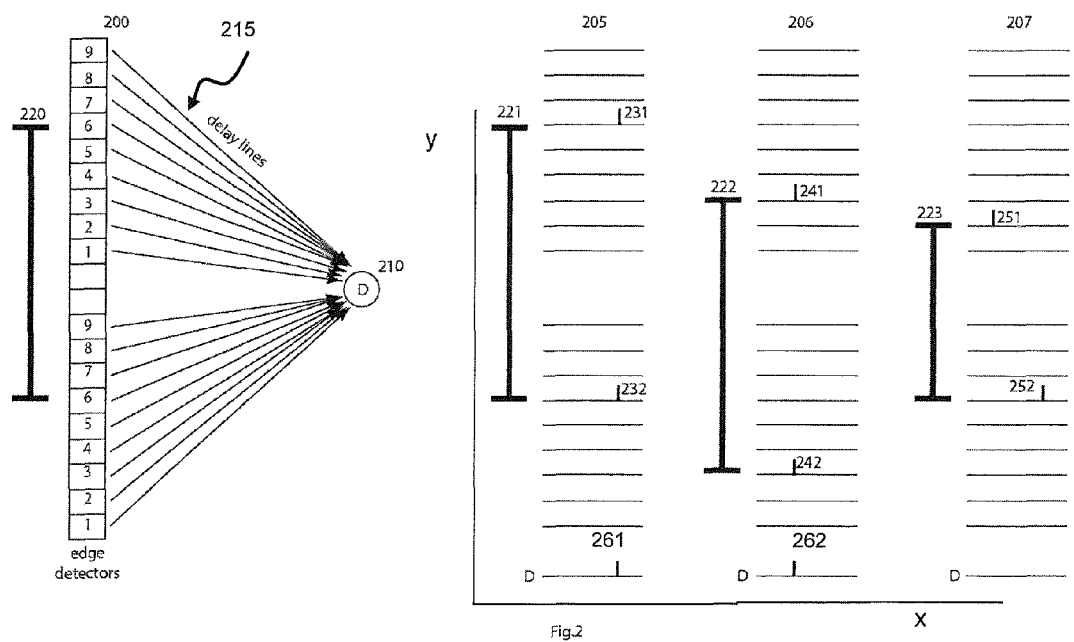
Fig.1
Fig.2

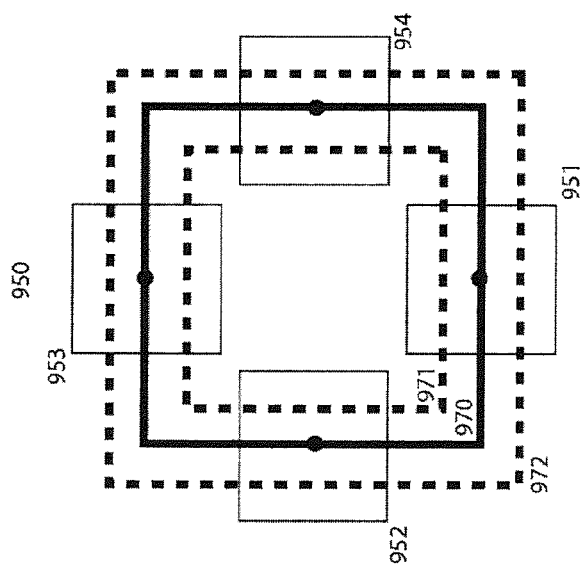
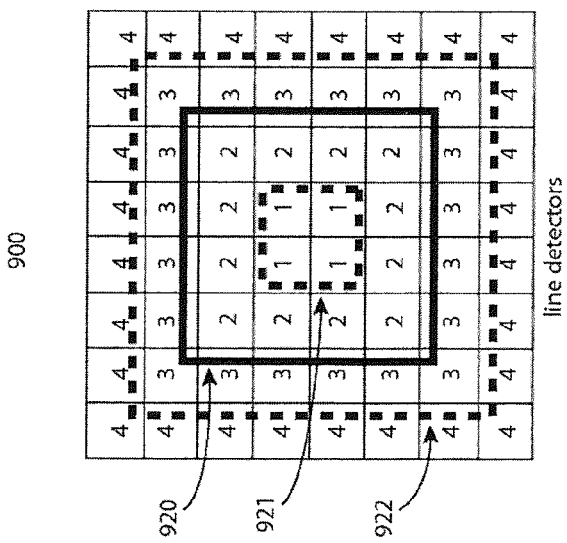
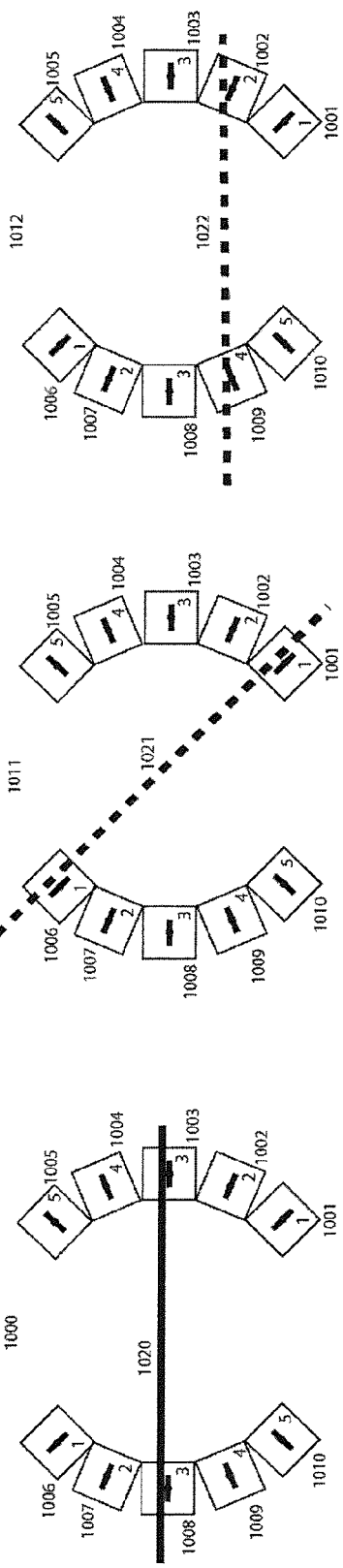
Fig. 9
Fig. 10

APPARATUS AND METHODS FOR PULSE-CODE INVARIANT OBJECT RECOGNITION

CROSS-REFERENCE TO RELATED APPLICATIONS

This application is related to co-owned U.S. Provisional Patent Application No. 61/318,191, filed Mar. 26, 2010 and entitled "Systems and MethodS for Invariant Pulse Latency Coding", U.S. patent application Ser. No. 12/869,573, filed Aug. 26, 2010 and entitled "Systems and Methods for Invariant Pulse Latency Coding", U.S. patent application Ser. No. 12/869,583, filed Aug. 26, 2010 and entitled "Invariant Pulse Latency Coding Systems and Methods", U.S. patent application Ser. No. 13/152,105 filed contemporaneously herewith on Jun. 2, 2011 and entitled "Apparatus and Methods for Temporally Proximate Object Recognition", and U.S. patent application Ser. No. 13/152,119 filed contemporaneously herewith on Jun. 2, 2011 and entitled "Sensory Input Processing Apparatus and Methods", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to object recognition and identification in a computerized processing system, and more particularly in one exemplary aspect to a computer vision apparatus and methods of pulse-code invariant object recognition.

2. Description of Related Art

Object recognition in computer vision is the task of finding a given object in an image or video sequence. It is often desired to recognize objects invariantly with respect to object parameters, such as position, size, or orientation. Typically, an object of interest is identified in a visual field, and a variety of transformations is performed (e.g., scale, translation, etc.) in order to transform a "raw" object to a preferred, optimal, or canonical form for subsequent analysis. Such approach generally requires a mechanism of rough estimation of the location of the raw object of interest in a visual field that often contains additional 'unwanted' objects, such as for example noise, background, and other distracters that complicate or impede object recognition efforts.

Other object recognition techniques rely on a matched filter approach. Under this approach, objects are detected by a bank of filters, with each filter tuned to a particular object type, size, and/or location. Therefore, the filter produces an output signal when it detects a 'match' in an incoming signal. Matched filter techniques require a multitude of filters, as they must be placed at multiple locations where the object can be present; each location requires filters tuned to different size of the object, and possibly different rotation. This is performed for every object of interest, so the matched filter technique scales poorly as the number of objects of interest increases, as redundant filters for all possible parameters of the object (e.g., size, orientation, and location) are required.

Accordingly, there is a salient need for a computerized object recognition solution that offers a lower cost and complexity, yet which is capable of dealing with many objects having different parameters.

SUMMARY OF THE INVENTION

The present invention satisfies the foregoing needs by providing, inter cilia, apparatus and methods for pulse-code invariant object recognition.

In one aspect of the invention, an apparatus configured for object recognition is disclosed. In one embodiment, the apparatus is configured to receive a first visual signal representative of an object, an encoder configured to encode the first visual signal into a plurality of pulses, and a one or more detectors coupled by a plurality of transmission channels to the encoder such that each of the of transmission channels is associated with a delay configured to effect a coincident arrival of at least two of the plurality of pulses to at least one of the detectors. The information related to identity of the object is encoded into a pattern of latencies of the plurality of pulses relative to one another, and a parameter associated with the object is encoded into a group delay that is common to all pulses within the plurality of pulses and the coincident arrival of the pulses is substantially invariant to a change in a value of the parameter. In one variant, at least a portion of the plurality of transmission channels is configurable to be adjusted based at least in part on a second input signal, the second input signal temporally preceding the first visual signal.

In another variant, the apparatus further includes a user interface configured to generate an indication and a controller configured to generate a signal responsive to the coincident arrival.

In another aspect of the invention, an apparatus configured to encode a signal representative of an object is described. In one embodiment, the apparatus includes an encoder configured to encode the first input signal into a plurality of pulses, such that information related to identity of the object is encoded into a pattern of latencies of the plurality of pulses relative to one another; and a parameter associated with the at least a portion of the object is encoded into a group delay that is common to all pulses within the plurality of pulses. In one variant, the object parameter is one or more of position, size, and orientation of the at least a portion of the object.

In another embodiment, the apparatus comprises at least one detector coupled to the encoder via a plurality of channels, the plurality of channels forming a plurality of connections. The plurality of pulses is configured for transmission through at least a subset of the plurality of connections, and each of the plurality of connections is associated with a delay configured to effect a coincident arrival of at least two of the plurality of pulses to at least one detector invariantly to a change in a value of the parameter.

In one variant, information related to two different parameters of the at least a portion of an object is transmitted via two different subsets of the plurality of connections. A first plurality of delays corresponds to a first subset of the two different subsets and a second plurality of delays corresponds to a second subset of the two different subsets, the first plurality of delays is not identical to the second plurality of delays.

In another embodiment, the detector is configured to generate a detection signal based at least in part on the coincident arrival and the apparatus further comprises a processing apparatus coupled to the detector and configured to receive the detection signal and to generate a response, the detection signal having a detection signal latency configured based at least in part on the group delay; and the response configured invariantly with respect to the parameter.

In one variant, at least a portion of the plurality of connections is channels is configurable to be adjusted based at least in part on a second input signal, the second input signal temporally preceding the first input signal.

In another variant the plurality of channels comprises one or more virtual channels carried in a physical transmission medium.

In another variant, the apparatus further includes a control interface, the interface configured to provide an interface signal based at least in part on a detection of a predetermined parameter in the first signal, the interface signal adapted for delivery to an apparatus selected from the group consisting of (i) robotic apparatus; and (ii) prosthetic apparatus.

In yet another variant, each of the plurality of pulses is generated at least in part responsive to an event selected from the group consisting of (i) a temporal change in the first input signal; (ii) a spatial change in the first input signal; (iii) a trigger; and (iv) a timer alarm related to a second event, the second event preceding the event, and the group delay is configured based at least in part on the event.

In another variant, the encoder comprises a preferred parameter range, and the group delay is selected responsive to a deviation of the parameter from the preferred parameter range.

In a third aspect of the invention, a method of encoding information related to an object for use in a digital processing apparatus is disclosed. In one embodiment, the method comprises receiving an input signal comprising a representation of the object, detecting at least a portion of the object, responsive to the detecting, generating a plurality of pulses, encoding information related to an identity of the object into a pattern of latencies of the plurality of pulses, relative one pulse to another pulse; and encoding a parameter associated with the at least a portion of the object into a group delay that is common to all pulses within the plurality of pulses.

In one variant, the object parameter is one or more of a position, size, and/or orientation of the object.

In another variant, the group delay is selected responsive to a deviation of the parameter from a preferred parameter range.

In another embodiment, the method further includes transmitting the plurality of pulses through a plurality of channels to at least one node, wherein each of the plurality of channels is associated with a delay configured to cause a coincident arrival of at least two of the plurality of pulses to the node invariantly to a change in a value of the parameter.

In one variant, information related to two different parameters of the object is transmitted via respective ones of two different subsets of the plurality of channels.

In another variant, the transmission of the plurality of pulses is configured to cause at the least one node to generate a detection signal based at least in part on the coincident arrival and the method includes generating a response substantially invariant to the parameter, the response comprising a detection latency configured based at least in part on the group delay.

In another variant, at least a portion of the plurality of channels is configurable to be adjusted based at least in part based at least in part on a second input signal, the second input signal temporally preceding the first input signal.

In a fourth aspect of the invention, an image processing system comprises a processor configured to execute instructions maintained in a storage medium; the instructions cause the processor to process a signal representative of at least a portion of an image to extract and analyze information in the signal.

In a fifth aspect of the present disclosure, a method of encoding sensory information is disclosed. In one embodiment, the method includes encoding an input comprising a representation of a feature into a pulse group, the pulse group being transmitted along a plurality of channels; where the input comprises a visual image of the feature; wherein information related to an identity of the feature is encoded into a pattern of pulse latencies, relative one pulse to another within the group; and encoding a parameter associated with the feature into a group delay that is common to all pulses within the pulse group and common to all channels within the plurality of channels.

In one variant, the parameter includes one or more of a position, size, and/or orientation of the feature.

Further features of the present invention, its nature and various advantages will be more apparent from the accompanying drawings and the following detailed description.

BRIEF DESCRIPTION OF THE DRAWINGS

FIG. 1 is a graphical illustration of encoding of an input signal into a pattern of pulse latencies with respect to a temporal event according to one embodiment of the invention.

FIG. 2 is a block diagram of a first exemplary embodiment of the apparatus for encoding and decoding of objects invariantly with respect to the object's position according to the invention.

FIG. 9 is a block diagram of an exemplary embodiment of the apparatus for encoding and decoding of two-dimensional objects invariantly with respect to their size.

FIG. 10 is a block diagram of an exemplary embodiment of the apparatus for encoding and decoding of objects invariant with respect to their rotation according to the invention.

Figure 3:
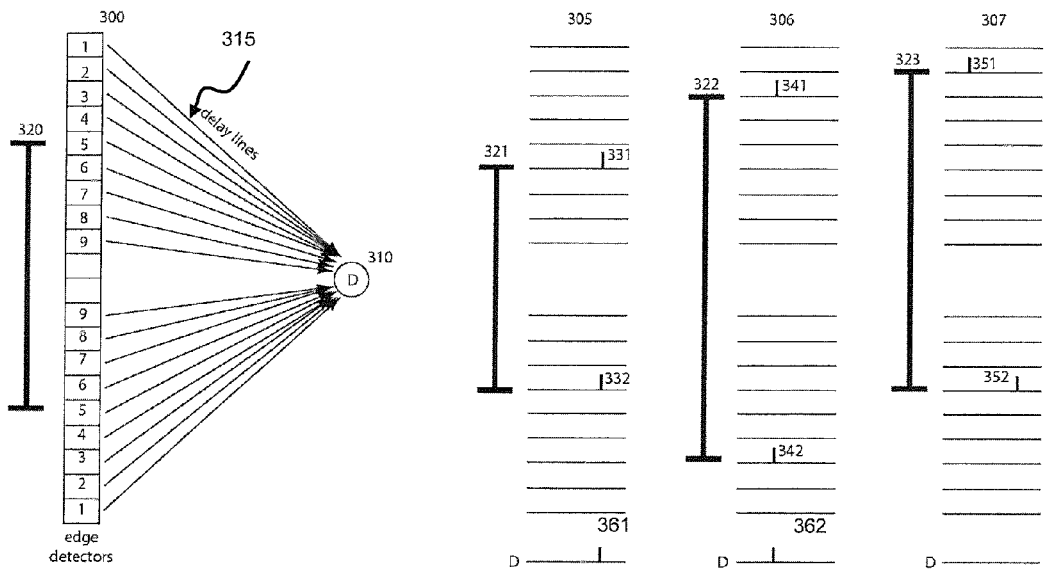
FIG. 3 is a block diagram of a first exemplary embodiment of the apparatus for encoding and decoding of objects invariantly with respect to the object's size.

All Figures disclosed herein are ® Copyright 2011 Brain Corporation. All rights reserved.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention.

In the present specification, an embodiment showing a singular component should not be considered limiting; rather, the invention is intended to encompass other embodiments including a plurality of the same component, and vice-versa, unless explicitly stated otherwise herein.

Further, the present invention encompasses present and future known equivalents to the components referred to herein by way of illustration.

As used herein, the terms "computer", "computing device", and "computerized device", include, but are not limited to, mainframe computers, workstations, servers, personal computers (PCs) and minicomputers, whether desktop, laptop, or otherwise, personal digital assistants (PDAs), hand-held computers, embedded computers, programmable logic devices, digital signal processor systems, personal communicators, tablet computers, portable navigation aids, J2ME equipped devices, cellular telephones, smartphones, personal integrated communication or entertainment devices, neuro-computers, neuromorphic chips, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the term "invariant" is meant to refer to, without limitation, the response of a recognition system or its components that is not substantially different when one or more parameters of the incoming signal are varied. For example, the system, or some of its subsystems, may generate a complex pattern of pulses in response to an input signal, and changing parameters of the signal would not change substantially the pattern of pulses, but only affect the time of its generation.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), memrister memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein the term "pulse pattern", "pattern of pulses", or "pattern of pulse latencies" is meant generally to denote a set of pulses, arranged (in space and time) in a predictable manner that is recognizable at a predetermined level of statistical significance.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase, or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software representation of a latency or timing of the pulse, and any other pulse or pulse type associated with a pulsed transmission system or mechanism.

As used herein, the terms "pulse latency", "absolute latency", and "latency" are meant generally to refer to, without limitation, a temporal delay or a spatial offset between an event (e.g., the onset of a stimulus, an initial pulse, or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the terms "relative pulse latencies" refer to, without limitation, a latency pattern or distribution within a group (or pattern) of pulses that is referenced with respect to the pulse group latency.

As used herein, the term "pulse-code" is meant generally to denote, without limitation, information encoding into a patterns of pulses (or pulse latencies) along a single pulsed channel or relative pulse latencies along multiple channels.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems such as GPS, millimeter wave or microwave systems, optical, acoustic, and infrared (i.e., IrDA).

Overview

The present invention provides, in one salient aspect, apparatus and methods for detecting and recognizing objects and/or object features invariantly with respect to one or more parameters of the object. These parameters may include, inter alia, distance/size, orientation, and position in the sensing field. Many other parameters useful with the invention exist, such as e.g., pitch for object/feature recognition in sound signals, texture for tactile signals, and transparency and color for visual objects. The object features may comprise, inter cilia, individual edges, intersections of edges (such as corners), orifices, etc.

In one exemplary embodiment, the incoming signal is encoded to produce a pulse-code output that only depends on a predetermined object type. The output-encoding algorithm is selected such that the output signal uniquely describes the identity of the object of interest. At the same time, the output pulse-code pattern is substantially invariant to (i.e., does not change with) a change of any of the object parameters (e.g. size) that are irrelevant to determining object identity.

In one implementation, an input signal (e.g., an image frame) is encoded into pulse-code output, such that object identity (for example, shape) is encoded into a pattern of pulses comprising a pulse-code group, and object parameters (e.g., size) are encoded into an offset (lag) of the encoded set with respect to an onset of the image frame. This advantageously separates the relative pulse latency (within the pulse-code set) from the absolute latency (the offset).

In another aspect of the invention, the encoded signal is transmitted via multiple channels to a decoder, which receives the pulsed signal and detects a coincident arrival of pulses on two or more different channels. In one implementation, the decoder is configured to produce secondary information, e.g., via encoding secondary information into the timing of pulses in an output of the decoder. In another variant, a hierarchy of decoders is used to detect complex objects that consist of combinations of elementary features and/or combinations of simple objects.

The transmission characteristics of different channels, e.g., the conduction delay or the strength of transmission; i.e., the strength of the impact of the incoming pulse onto the receiving unit, are adjusted adaptively based on the history of input image, so that the system did not have the invariant recognition property initially, but then acquires it through learning and adaptation.

In one implementation, the pattern of relative pulse latencies is generated in the pulsed output signal upon occurrence of one or more of a cyclic event, a clock signal, an internally generated oscillatory wave, arrival of an input frame, appearance of a new feature in the image and a time related to a previous event.

Embodiments of object recognition functionality of the present invention are useful in a variety of applications including a prosthetic device, autonomous robotic apparatus, and other electromechanical device requiring objet recognition functionality. In another implementation, portions of the object recognition system are embodied in a remote server.

Detailed Description of Exemplary Embodiments

Detailed descriptions of the various embodiments and variants of the apparatus and methods of the invention are now provided. Although certain aspects of the invention can best be understood in the context of conversion of visual input into pulse latency output and subsequent detection of objects of interest independently of their size, position, or rotation, embodiments of the invention may also be used for processing of signals of other, often non-visual modalities, including various bands of electromagnetic waves (e.g., microwave, x-ray, infrared, etc.) and pressure (e.g., sound, seismic, tactile) signals.

Embodiments of the invention may be for example deployed in a hardware and/or software implementation of a computer-vision system, provided in one or more of a prosthetic device, robotic device and any other specialized visual system. In one such implementation, an image processing system may include a processor embodied in an application specific integrated circuit ("ASIC"), which can be adapted or configured for use in an embedded application such as a prosthetic device.

For the purposes of this description, insensitivity of signal-to-pulse encoding with respect to position, size, and/or rotation of an object in the input signal may be understood as encoding that is invariant or substantially invariant to changes in the object position, size, and/or rotation, distance (for infrared or ultrasound waves), or pitch (for sound waves), etc.

Exemplary Encoding Apparatus

Referring now to FIGS. 1 through 10, exemplary embodiments of the invariant pulse-code encoding apparatus and methods of the invention are described. In one embodiment, the apparatus and methods encode an object (or an object feature such as, for example, a edge or a conjunction of edges) into a pattern of pulses and the parameters of the object, such as scale, position, rotation, into the timing of the occurrence of the pattern as described in detail below.

It is known in the field of neuroscience that neurons generate action potentials, often called "spikes", "impulses", or "pulses" and transmit them to other neurons. Such pulses are discrete temporal events, and there could be many pulses per unit of time. Conventionally, bursts of a few spikes are considered to be pulses.

In one embodiment of the invention shown and described with respect to FIG. 1, the input signal is presented as a sequence of visual frames 100, 101, 102. The input signal may be for example an image received from an image sensor (such as a charge-coupled device (CCD) or a complementary metal-oxide-semiconductor (CMOS) active pixel) camera or downloaded from a file, or a two-dimensional matrix of red-green-blue (RGB) three color model values (e.g., refreshed at a 30 Hz or other frame rate). It will be appreciated by those skilled in the art that the above image parameters are merely exemplary, and many other image representations (e.g., bitmap, cyan-magenta-yellow- and key (CMYK) four color model, grayscale, etc.) are equally applicable to and useful with the present invention.

The visual signal is transformed (encoded) into a group of pulses (e.g., pulses 121-124 in FIG. 1), also referred to as "pattern of pulses" that are transmitted along multiple communication channels 111-114 using any of the mechanisms described below. In the exemplary embodiment of FIG. 1 pulse latency is referenced with respect to an appearance of the respective input frame (denoted by vertical broken lines 125, 135, 145 of FIG. 1) (for example, arrow 144 denotes the latency of pulse 124 in FIG. 1). In one variant, an event trigger, such as a sudden change in the visual signal (e.g., due to a visual saccade or sudden movement of the image camera, movement of parts of the visual signal, appearance or disappearance of an object in the visual scene), or a clock signal, are used as the temporal reference.

Pulse group latency is further defined as a latency of the first pulse within the pulse code group; e.g., the pulse group latency 160 corresponds to the latency of a pulse 121 of the pulse group 131. In one variant, a small offset is added to the latency 160 (as shown in FIG. 1) to allow for a possible pulse timing jitter. Other implementations may be used as well, such as measuring latency relative to some temporal event; e.g., the appearance or a change of the input image, an internal clock/timer alarm, or external trigger.

Pulse relative latency is then determined as the difference between latencies of the two respective pulses within the pulse group; e.g., the relative latency 150 is the difference of latencies 144, 146 corresponds to the pulses 122,123, respectively. In the embodiment of FIG. 1, the incoming frames are encoded into a pattern of relative pulse latencies. As a result, the pulse-code group 131 is an encoding representative of an object in the input frame 100.

The encoding method of the exemplary embodiment of FIG. 1 is configured such that objects of different type correspond to a different relative pulse latency pattern. Specifically, input frames 100, 102 containing different objects (for instance, a rectangle 100 and a triangle 102) are encoded into different patterns of relative pulse latencies 131, 133.

When encoding frames containing an object of the same type (e.g., a rectangle 100, 101), the encoding method generates pulse-code groups 131, 132 having the same relative pulse latency pattern as shown in FIG. 1.

At the same time, the encoding algorithm of FIG. 1 translates information related to object parameters (e.g., rectangle size in frames 100, 101) into a temporal shift, also referred to as the group lag, or group delay, of the pulse groups by a different amount (160, 161), with respect to the onset of the respective visual frame. As shown in FIG. 1, smaller rectangle in the frame 100 corresponds to smaller group delay 160, when compared to larger rectangle in the frame 101.

Thus, the exemplary encoding algorithm of the invention is advantageously configured to decouple the identity of an object, which is encoded into the pattern of relative pulse latencies, from the parameters of the object (for example, size, orientation, position) in the input signal, which are encoded into the group lag of the pattern. This approach significantly simplifies implementation of an object decoder because, inter alia, the decoder can be configured to discriminate between objects of interest by matching relative pulse latency patterns without being confused by the object size, position, or orientation.

Advantageously, the exemplary approach described above with respect to FIG. 1 encodes object information that is not relevant to object type detection (e.g., size) into the group lag (pulse code pattern time shift). This approach further allows the encoder to skip additional steps, which are commonly performed by existing prior art techniques relating to scaling, rotation, and or translation of an incoming frame in order to transform the input frame onto an optimal state. The exemplary embodiment of FIG. 1 further alleviates the need for multiple (and often redundant) detectors that are tuned to different parameter combinations for each object type: e.g., detectors spread over all possible locations and tuned to all possible object sizes. These improvements translate into an apparatus that requires fewer detectors and fewer processing units, compared to the prior art, and allow taking advantage of the combinatorial "richness" of all possible pulse codes.

Invariant Object Encoding and Detection Via Delay Lines

FIG. 2 illustrates an exemplary embodiment of an encoding apparatus that is configured to encode and detect objects in a manner that is invariant of the object position. A one-dimensional input signal is used in FIGS. 2-4 for illustration purposes and without loss of generality. The exemplary embodiment of FIG. 2 comprises a set of edge detectors 200, each providing an input into the detector node 210 along delay lines 201. Each delay lines 201 (also referred to as transmission channels, or transmission lines) is associated with a predetermined transmission delay (also referred to as the propagation delay or the connection delay) value, denoted for each edge detector 200 by a corresponding numeral (e.g., from 1 to 9 in this example). To refer to the specific pair of detectors 200, the following notation is used hereinafter: a detector pair with the line delay of 4 units is denoted as 200_4, etc. Each edge detector 200 is configured to detect a change in a certain property of the input signal (e.g., intensity), with respect to a preceding detector, and to produce an output signal when the change exceeds a predetermined threshold. It will be appreciated by those skilled in the art that the above edge detector can be implemented using many existing methods, e.g., linear Gabor filters and threshold-based detectors.

The exemplary embodiment of the detector apparatus (i.e., 200, 210) in FIG. 2 is configured to discriminate objects based on their size (for example, length) and to produce an output pulse if an object of a predetermined size is present in the input signal, invariant to the position of the object, provided the object is within the sensing range of the edge detectors 200. The detector apparatus of FIG. 2 is configured to generate a zero output (e.g., remain in the base state with no output pulses) when the input signal contains objects of a wrong type or size.

When a stimulus, e.g., a bar 220 in FIG. 2, is present in the input signal, the edge detectors that are closest to the edges of the stimulus (edge detectors 200 with a line delay of 6 units) detect the object edge, and generate output pulses (depicted in 205, which is often called a pulse raster), which propagate to the detector node 210 with appropriate conduction delays (e.g. 6 units). The detector unit 210 uses the received input pulses to decode information about the stimulus objects by acting as a coincidence detector. For example the detector node 210, initially in a zero (FALSE) state, transitions to a 'TRUE' state and generates a pulse output if the received pulses are coincident (or nearly coincident with some allowable jitter). If the received pulses are not coincident, the detector node 210 remains in the zero state. It will be appreciated by these skilled in the art that the above coincident detector can be implemented using many existing neuronal models, e.g., the integrate-and-fire model, Hodgkin-Huxley model, FitzHugh-Nagumo model, or quadratic integrate-and-fire model, as well as others.

Returning now to FIG. 2, exemplary invariant image encoding with respect to object position is described in detail. Image encoding is present as pulse rasters 205, 206, 207, where the time is plotted along the x-axis, and the pulses arriving to the detector node along different transmission delay lines are plotted along the y-axis. For clarity, the exemplary description of FIG. 2 is limited to object position changes occurring in one dimension; i.e., along the vertical y-axis. However, it is appreciated by those skilled in the art that the apparatus and methodology described herein are equally applicable to more generalized two-dimensional and three-dimensional detection of object position.

When an object 221 is present in the sensing field of the system, it causes the corresponding edge detectors (e.g., 200_6) to generate pulses 231, 232, which propagate along delay lines 215 and arrive to the detector 210 with the conduction delay of 6 units. Since both pulses arrive in coincidence (with the same delay), the object detector 210 generates an output signal 261 (here, a pulse corresponding to 'one') with the latency equal or slightly greater than the propagation latency of the pulse-pair (e.g., latency of 6 for the pulses 231, 232).

When the object is in a different location (for example, bar 222), it is sensed by a different set of edge detectors (200_3). The detectors 200_3 generate pulses 241, 242, which propagate along the delay lines 215 arrive to the object detector 210 in coincidence with the delay of 2 units. As a result, the object detector 210 generates the output signal 262 with the latency equal or slightly greater than 2 units. Note that the edge detectors 200 of the exemplary embodiment presented in FIG. 2 are configured such that the encoded pulse-pairs 231, 232, 241, 242 in rasters 205, 206, respectively, are nearly synchronized in time. This configuration causes the detector 210 to generate a positive (TRUE) for both pulse rasters 205, 206, thereby effecting a position invariant object detection; that is, the apparatus of FIG. 2 decodes objects in the input signal of a certain preferred size regardless of their position.

The apparatus of FIG. 2 behaves quite differently when it encounters an object of a different size within its sensing field. A shorter bar 223 (as compared to the bars 221, 222) causes edge detectors 200_6, 200_1 to generate pulses 251, 252 that propagate along the delay lines 215 and arrive to the object detector 210 with different conduction delays of 6 and 2 units, respectively. The detector 210 is configured to ignore non-synchronous pulse pairs, thereby failing to elicit an output signal. As a result, the object 223, which is of an inappropriate size for the detector configuration 200, is ignored (not detected) by the apparatus of FIG. 2. Notice that the edge detectors used in the apparatus of FIG. 2 are but one possible choice, and other elementary feature detectors such as e.g., line detectors of a predetermined orientation (in a two-dimensional space), can be utilized as well, whether alone or in conjunction with those depicted in FIG. 2.

It is appreciated by those skilled in the art that changes in the object size (such as described above with respect to bars 221, 222) may also be caused by the change in the relative orientation between the object and the plane of the detector array 200, so that a size of an object projected onto the array 200 is different for two relative orientations, even when the object size itself is the same (same identity). To discriminate between projection changes due to rotation from the projection change due to object size, multiple sets of edge detector arrays 200 (one set per each additional degree of freedom) can be used. Object detection that is invariant with respect to rotation is described in detail below with respect to FIG. 10.

FIG. 3 illustrates an embodiment of an apparatus according to the invention that encodes and detects objects at a preferred position, but invariantly with respect to the object size. Again, a one-dimensional visual input signal for illustration purposes and without loss of generality is used. Similar to the exemplary apparatus of FIG. 2, the apparatus of FIG. 3 contains a set of edge detectors 300 that are configured to generate output pulses only when an object change is present within the sensing field of the detector 300. The delay lines 310 from the edge detectors 300 to the object detector 310 are arranged to generate pulse-pairs that arrive simultaneously to the object detector node 310 (i.e., in pulse-pairs 331, 332 and 341,342 in rasters 305, 306, respectively), when an object of any size (for example, length) is centered at the preferred position, such as the middle of detector array 300. Synchronous arrival of a pulse pair to the detector 310 elicits a detection output signal (e.g., pulses 361, 362) that correspond to the bars 321, 322, respectively, that are located at the preferred position (the middle of the detector array 300).

An object of any size that is not centered at the detector array 300 (e.g., bar 323) causes the detector 300 to generate pulses 351, 352 in the raster 307 that arrive to the object detector 310 with different lags; i.e. not simultaneously. As a result, the detector 310 ignores the pulse pair 351, 352, and the bar 323 is ignored by the apparatus of FIG. 3. This way, the apparatus encodes the objects at certain preferred location and decodes them regardless of their size.

Figure 4:
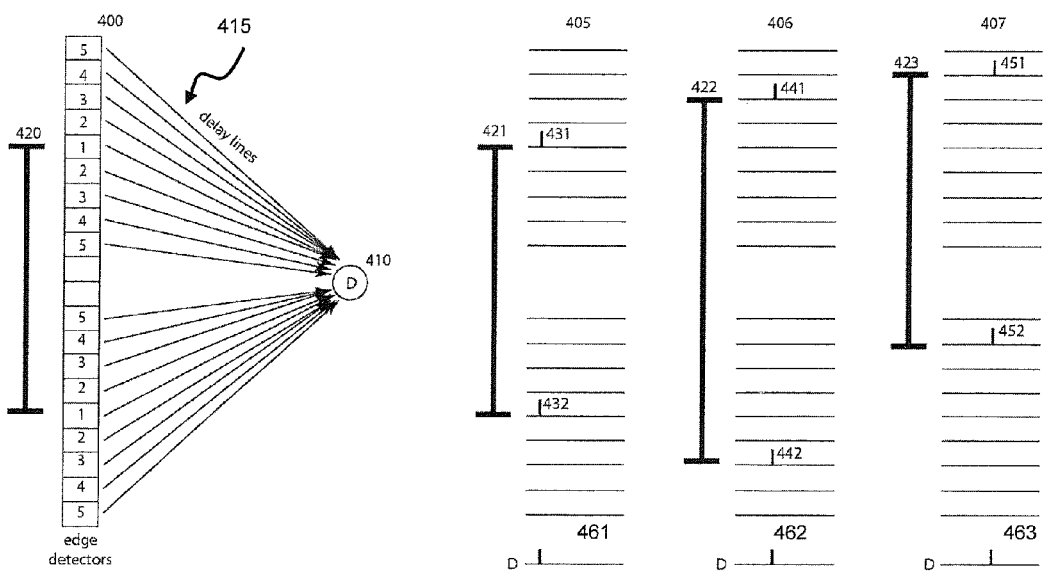
FIG. 4 is a block diagram of a first exemplary embodiment of the apparatus for encoding and decoding of objects invariantly with respect to both size and location of the object.

It will also be appreciated that the distribution of conduction delays along the delay lines can be arranged in other ways, and not necessarily in a monotone way (as in FIGS. 2 and 3), in order to achieve versatile encoding and decoding schemes. For example, FIG. 4 illustrates an embodiment of an apparatus that is invariant to both object size (at a certain position) and to object position (of a certain object size). That is, the object detector in FIG. 4 encodes the identity of the object of a certain size at a certain location, and the latency of the decoder output encodes the deviation from this certain size and position.

To see how the objects in FIG. 4 are detected, consider the object 420 presented at a given (e.g., optimal) location and size so that the edge detectors with the shortest conduction delay (conduction delay of 1 in the array 400 in FIG. 4) generate pulses. The pulses 431, 432 arrive to the detector node 410 at the same time, triggering the detector 410 to generate a detection signal 461. A larger object 422, still centered at the same location, causes a different pair of edge detectors to generate pulses along different delay lines. The pulse-pair 441, 442 to the detector node 410 with the delay of 3 units. However, the pulses again arrive simultaneously as long as the object is centered at the same location. Similarly, contracting the size of the object (not shown), but keeping it centered at the same location, maintains the synchrony of pulse arrival to the detector node 410, and only changing the absolute latency of arrival. In all these cases, the apparatus detects the object and generates an output pulse with the latency that encodes the size of the object.

The apparatus of FIG. 4 responds similarly to an object of a given size 420 that is shifted to a different location; such as in the bar 423. A different set of edge detectors 400 conveys the information about the object along the delay lines 415 to the detector node 410, yet the pulses 451, 452 arrive simultaneously to the detector 410, resulting in the output detect signal 463. Therefore, the arrangement of delay lines in FIG. 4 allows for encoding and decoding of the object regardless of its size and location at the same time.

Exemplary Method

Figure 5:
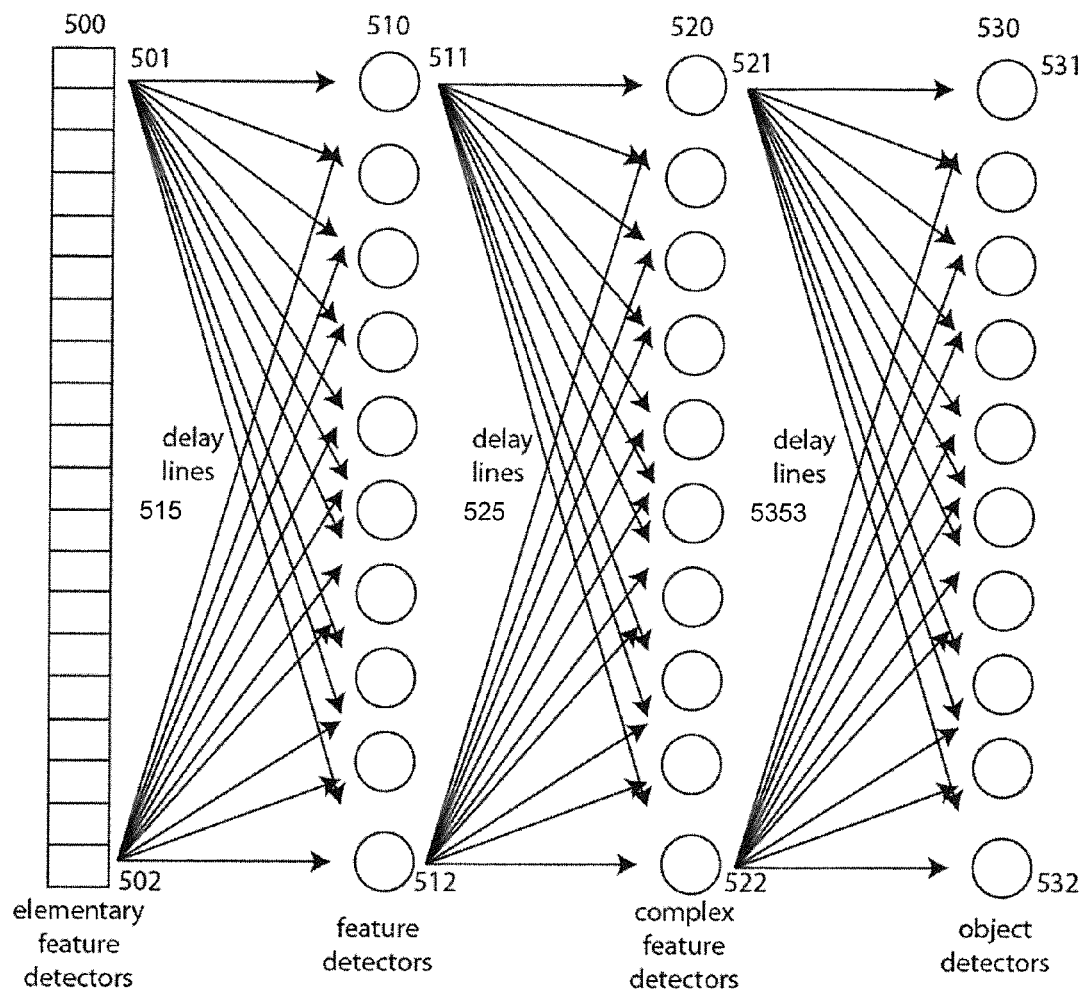
FIG. 5 is a block diagram of an exemplary embodiment of a hierarchal network of pulse detector nodes with a plurality of delay lines according to the invention.

More complex objects having e.g., a background of other objects, are invariantly recognized by a multi-layer system of delay lines illustrated in an exemplary embodiment of FIG. 5. These complex objects are constructed of various features—some of them are elementary (e.g., have edges), while others are more complex (e.g., have conjunctions of edges). The delay lines 515, 525, 535 of the detector arrays 500, 510, 520 are configured to provide a capability for a downstream layer of pulse detector nodes to extract information provided by a previous layer, and encode the information into the pattern of relative pulse latencies as further described below with respect to FIG. 5.

In one exemplary variant, as applied to visual recognition of an alphabet, the elementary detectors 500 correspond to an edge detector array; the first detector array 510 corresponds to a bar detector; the second detectors 520 correspond to angle detectors; i.e., a detector that is configured to identify a conjunction of bars (such as detecting corner in letters such as 'L' or 'T'); and the third detectors 530 correspond to letter detectors (e.g., 'K,' 'H'). Detectors of arrays 510, 520, 530 are also referred to as the "pulse detector nodes", the "detector nodes", or the "nodes".

In another variant, the detectors 500 are configured as edge detectors, while other detectors 510 are configured to detect two-dimensional (2D) edges at a certain orientation and certain positions. Yet other detectors 520 detect the 2D edges at a certain orientation and any position, while other detectors 530 detect corners at any position.

In yet another variant, the invention contemplates use of subsequent layers of detectors (not shown) that are configured to detect more complicated objects; e.g., faces, gestures, etc., regardless of the position. A myriad of other possible detector cascades will be recognized by those of ordinary skill given the present disclosure.

The elementary feature detectors 500 are configured similar to the edge detectors 200 of FIG. 2. The detectors 500 receive an in input signal (RGB, bitmap, grayscale, etc), and they generate pulse rasters responsive to a detection of an edge.

Higher-level detectors 510, 520, 530 (depicted by circles) are configured to receive pulses as input, and to generate output pulses based on their dynamic structure. In one variant, the detectors 510, 520, 530 are configured as coincidence detectors. In another variant, the detectors 510, 520, 530 are configured as integrate-and-fire units of the type well known in the art, wherein the detectors 510, 520, 530 are configured to integrate incoming pulses over certain time window and to produce ('fire') a response once a predetermined threshold is reached. In still another variant, the detectors are configured using mathematical equations to describe dynamics of neurons (Izhikevich 2007), e.g., Hodgkin-Huxley-type neurons, quadratic integrate-and-fire neurons. In yet another variant, the detectors are configured using a combination of two or more of the aforementioned methods.

Returning now to FIG. 5, the elementary feature (for example, edge) detectors 500 produce pulsed signals depending on the presence of edges or other elementary features in the corresponding positions in the input visual signal. They generate pulses, which propagate with different delays along delay lines 515 to a bank of decoders 510 that are configured to detect more complex features, such as the conjunction of two edges, invariantly with respect to the location or size. Only connections from the elementary feature detectors 501, 502 are depicted in the Figure for clarity. The bank of feature detectors 510 generates pulses with various latencies determined by the parameters of the features, and these pulses propagate with different conduction delays to the next layer 520 to detect more complex features. Only connections from some detectors (511, 521, 531, 512, 522, 532) and only 4 layers are depicted in FIG. 5 to preserve clarity. Pulses propagate to the object feature detectors with appropriate conduction delays, so that the object detectors encode the objects in the sensing field into a pattern of relative pulse latencies, and the parameters of the object affect the time of the appearance of the pattern of relative pulse latencies; i.e., as the group lag.

In another embodiment (not shown), the delay lines are assigned weights, also referred to as "synaptic weights". The weights convey the strength of connections and other attributes of transmission of signals. Instead of pruning/removing connections, the system can modify the connections according to one or more rules. For example, connections that result in pulse output of the detector node are strengthened or weighted more heavily, while connections that do not result in pulsed output are weakened or weighted less heavily. Other rules, such as e.g., a spike-timing dependent plasticity rule (STDP) that modifies the parameters of connections depending on the timing of incoming pulses and the timing of output pulses, may be used as well.

In one variant, the conduction delays and the strength of connections in the apparatus of FIG. 5 are pre-programmed to achieve the desired functionality. In another variant, the delays and/or the connection strength are learned via experience using activity-dependent plasticity (see Izhikevich E. Polychronization: Computation with Spikes. *Neural Computation,* 2006, 18, 245-282, incorporated herein by reference in its entirety), such as spike-timing dependent plasticity (Sjostrom J., W. Gerstner. Spike-Timing Dependent Plasticity. *Scholarpedia,* [Online], 2010, 5(2), 1362), also incorporated herein by reference in its entirety). As objects of different sizes and at different locations are presented to the detection system, connections between different pulse-generating nodes are modified as to achieve the desired functionality of invariance with respect to the parameters of the objects.

In another variant, several redundant connections with various delays; e.g., all possible delays, are utilized for each of the node pair. An object of interest is introduced, and the detection apparatus begins generating and propagating pulses along a cascade of detector arrays (e.g., from detector 500 to 510, or from detector 510 to 520, etc.). The delay lines that convey coincident pulses are kept intact, whereas the lines that convey non-coincident pulses are pruned/removed. Subsequently, the same object, but with a different parameter(s), e.g., at different location, is introduced to the detection system, causing pruning/removal of a new set of connections. By systematically varying parameters of the object, only those connections that convey coincident pulses remain.

In yet another variant, the delay lines 515, 525, 535 employ variable delays that are adaptively adjusted at run time (e.g., during operation of the detection system) to produce coincident pulses when the object of interest is presented at different locations (or as a different size).

Advantageously, modifying the transmission characteristics (delays, weights) adaptively as described above does not require pre-programming (hard-wiring) of the detection system connection. Similarly, the adaptive learning and configuration of transmission characteristics methodology is applicable to invariant object encoding and detection via latency coding described in detail below.

Other embodiments of the present invention contemplate detecting objects in non-visual signals; e.g., phonemes and words in the auditory signal, objects in infrared or other invisible spectrum, or tactile objects in somatosensory signals. In all these cases, the elementary feature detectors should be modified to detect elementary features of the corresponding modality of the sensory input (vision, audio, tactile, etc.).

Figure 5A:
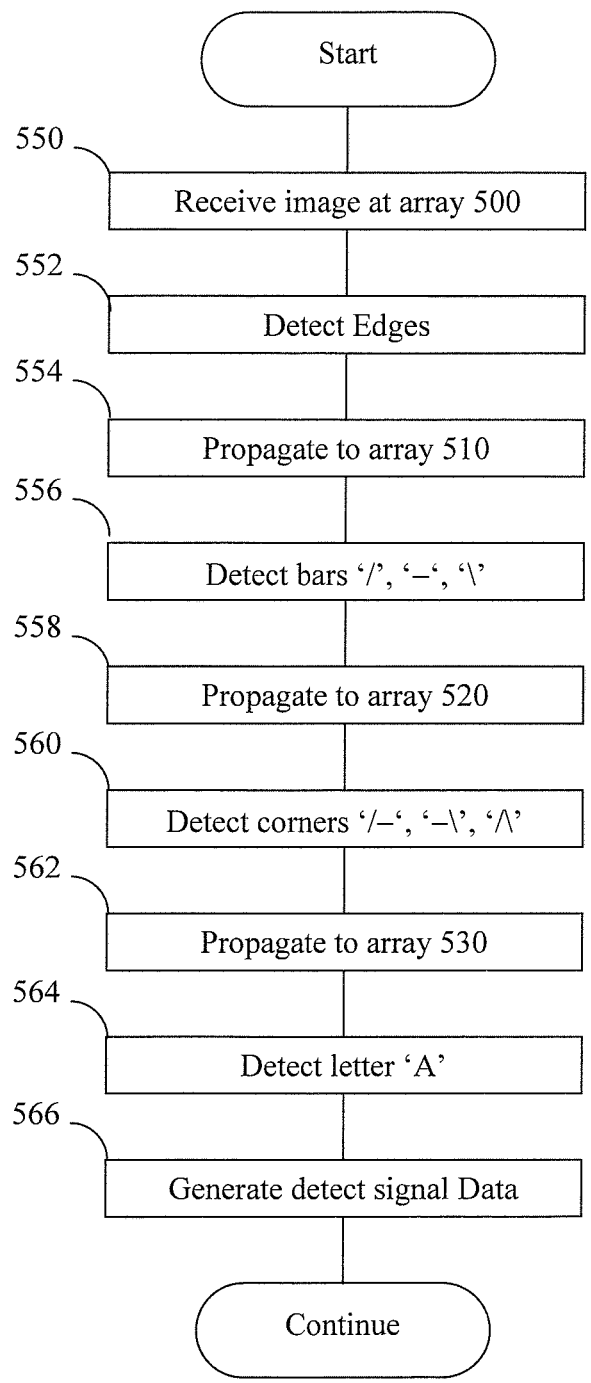
FIG. 5a is a logical flow chart illustrating one embodiment of the method of encoding and decoding of objects according to the exemplary embodiment of FIG. 5.

An exemplary method of detecting a letter is described below with respect to FIG. 5a. At step 550, an array of elementary feature detectors (e.g., edge detectors 500 of FIG. 5) receives an input signal (e.g. a visual frame, a digitized SONAR, RADAR, or tomography image, etc.). At step 552, the array 500 detects a set of edges corresponding to different bars composing the letter, e.g. letter 'A' in this example. At step 554 the output pulses generated by the edge detectors are transmitted to the 'downstream' array 510 of feature detectors.

At step 556, detectors of the array 510 detects each of the bars (e.g., '/', '-', '\') of a predetermined size, and orientation.

At step 558, the output pulses generated by the detector array 510 are transmitted to the array 520 via a subset of delay lines 525.

At step 560, detectors of the array 520 detect each of the intersection of the bars (e.g., corners '/-', '-\', '/\') of a predetermined orientation.

At step 562, the output pulses generated by the detector array 520 are transmitted to the array 530 via a subset of delay lines 535.

At step 564, detectors of the array 530 detect the letter 'A' of a predetermined size, position and orientation.

At step 566, the output detection signals are generated by the detector array 530 for further use. Note that different detectors of the array 530 (e.g., 531, 532) may be configured to detect a different set of parameters corresponding to the same object (e.g., letter). That is, the detector 531 is tuned to detect the upright letter A, while detector 532 is configured to detect the letter rotated by 90°:

Invariant Object Encoding and Detection Via Latency Coding

Referring now to FIGS. 6-9, a second aspect of object detection in accordance with the principles of the present invention is described in detail. The embodiments of the apparatus of FIGS. 6-9 employ a different mechanism of object encoding, where edge detectors: (i) use a larger sensing field; (ii) are configured to analyze the total area of the sensing field; and (ii) generate pulses whose delay/latency depends on the position of the edge within the sensing field. This approach differs from the approach described above with respect to FIG. 2, wherein each edge detector generates a pulse if an edge is present, and the latency of the output pulse is assigned a fixed value, independently on the location of the edge within the sensing field (also referred to as "receptive field") of the detector. The sensing field of the detectors 200 is so small that the detectors 200 are only capable of detecting a presence of an edge: (i.e., an edge is present or not). As a result, the detectors 200 do not discriminate between edges being at different locations within the receptive field of each individual detector. In contrast to the embodiment of FIG. 2, the receptive field of detectors 631, 632 of the embodiment of FIG. 6 (described below) is much larger, so that an object edge is detectable at a plurality of locations by a single detector.

Figure 6:
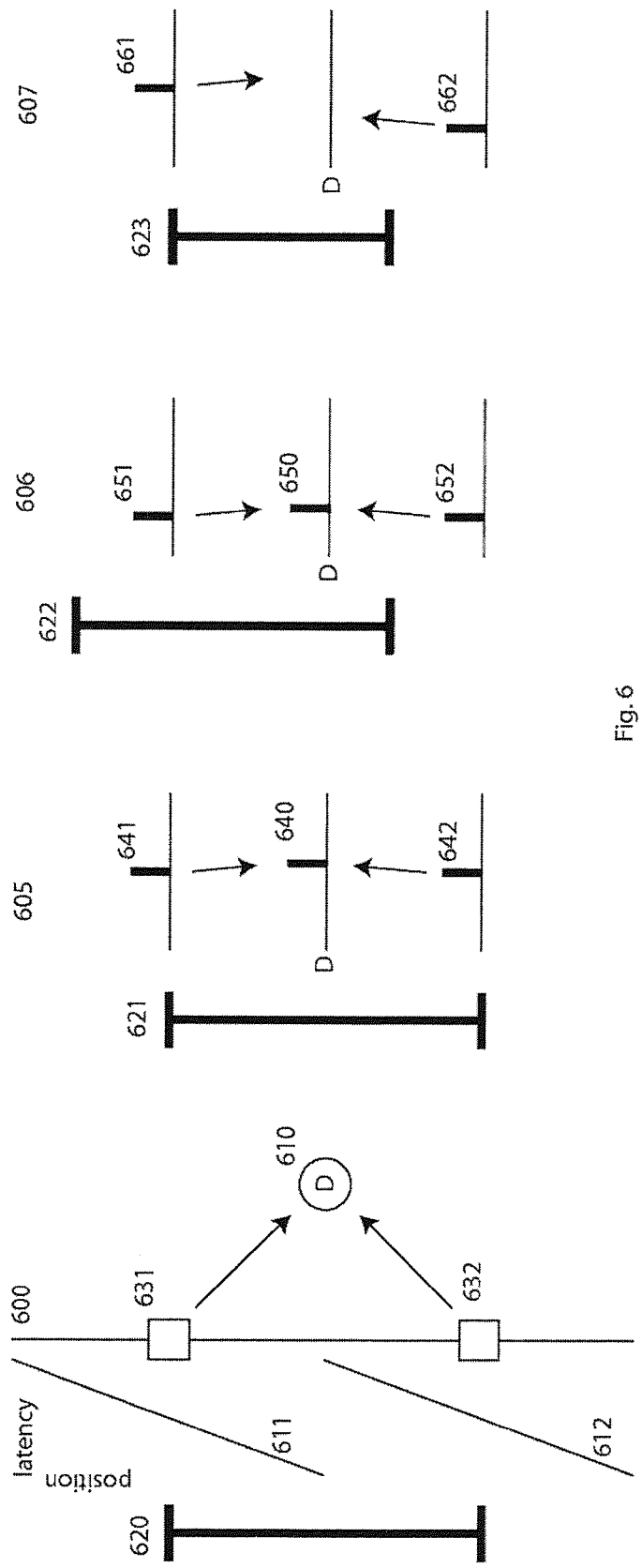
FIG. 6 is a block diagram of a second exemplary embodiment of encoding and decoding of objects invariantly with respect to the position of the object according to the invention.

FIG. 6 illustrates an exemplary embodiment of an apparatus that uses pulse latency coding to encode and detect objects in a manner invariant of the object position. It is appreciated that a one-dimensional input signal is used in this example for purposes of illustration only, and without loss of generality. The sensing field space 600 contains an array of elementary feature detectors (with only two detectors 631, 632 shown for clarity). The detectors 631, 632 are configured to generate pulses in response to the presence of edges. The latency of each generated pulse depends on the position of the corresponding edge within the sensing field of the detector. The dependence of latency on position of the edge is depicted as a locus of lines 611, 612. Points along the lines 611, 612 that are closer to the top correspond to a shorter delay (smaller latency). Although a linear delay distribution 611, 612 is shown in the exemplary embodiment of FIG. 6, other distributions (e.g., nonlinear distribution, or a stochastic pulse-generating system with probability distribution function that depends on the position of the stimulus) may be used as well.

The elementary feature detectors 631, 632 are connected to the detector 610, which is configured to generate a detection signal in response to a simultaneous arrival of two pulses. A one-dimensional bar 621 of the optimal size presented in raster 605, evokes pulsed responses 641, 642 from the elementary feature detectors 631, 632. As the pulses 641, 642 have equal latency; they arrive in coincidence at the detector 610, hence evoking a detection signal (the pulsed response 640).

An upward displaced bar 622 produces a pulse raster 606 corresponding to a synchronous pulse pair 651, 652, but with smaller pulse response latencies, and to generation of a positive detection signal 650 by the detector 610. Similarly, a downward displaced bar (not shown) produces a synchronous pulse pair, but with greater pulse latencies, which is also detected by the detector 610.

A bar of a different size 623, as in raster 607, causes generation of pulses 661, 662, each having a different latency, so that their non-synchronous arrival is ignored by the detector 610.

In one implementation, a different detector-delay line array combination (with the transmission from the detector 632 delayed; not shown) is used to detect object of this size (e.g., bar 623), invariantly to their position.

Figure 7:
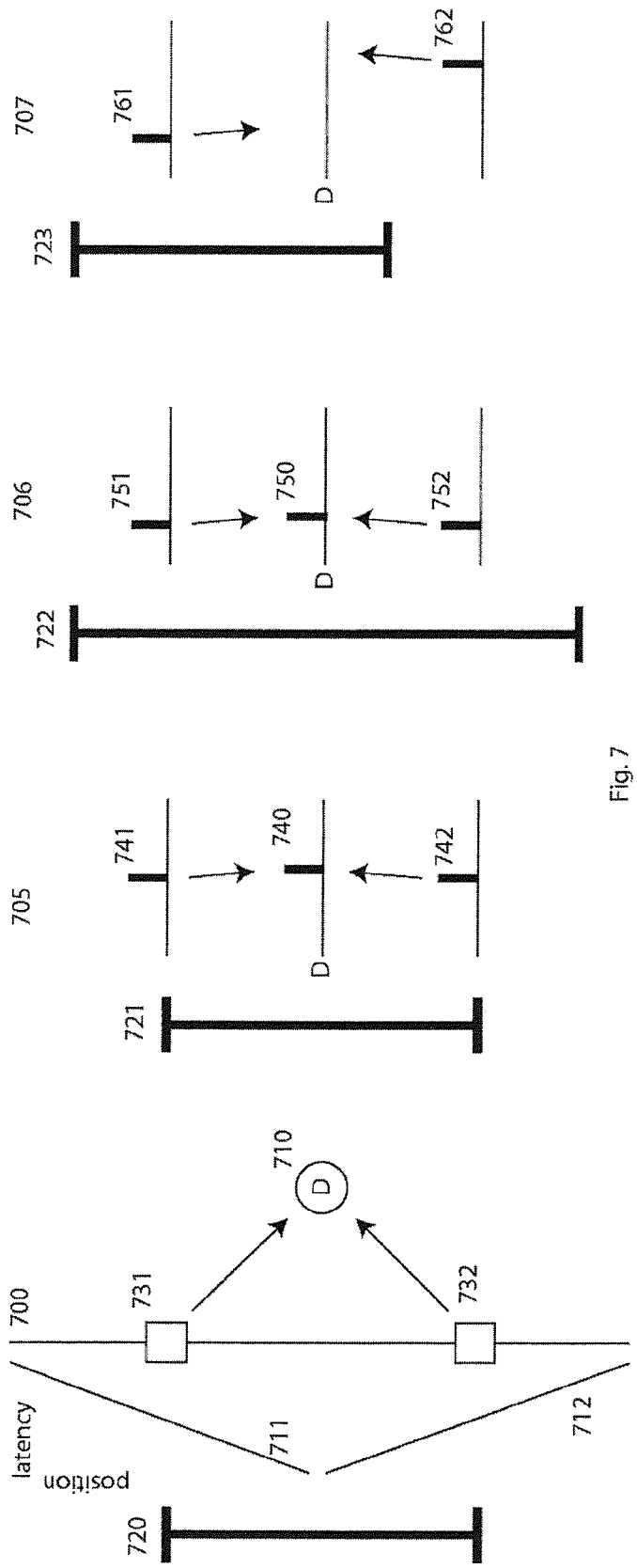
FIG. 7 is a block diagram of a second exemplary embodiment of the apparatus for encoding and decoding of objects invariantly with respect to their size.

FIG. 7 illustrates an exemplary embodiment of an apparatus according to the invention that is configured to encode and detect one-dimensional objects invariant of the object size. The elementary feature detectors 731, 732 respond to the presence of edges in their receptive fields by generating pulses 741, 742 with latencies according to the latency distributions 711, 712. The latency distributions 711, 712 are configured such that the resulting pulse latencies are identical as long as the bar 720 is centered at the given location, invariant of the size. The pulse pair 741, 742 arrives to the detector node 710 simultaneously, evoking a detection response 740. The detector 710 encodes the size of objects 721, 722 into the absolute latency of the detector responses 740, 750, corresponding to the pulse pairs 741, 742 and 751, 752, respectively, as illustrated in the rasters 705, 706. However, a stimulus that is not centered at the given (optimal) location, as with object 723 in raster 707, causes two pulses 761, 762 of different latencies which are ignored by the detector 710. It will be apparent to those skilled in the art that the object 723 may be detected by another delay line-detector combination (e.g., when the transmission from 731 is delayed; not shown) that is configured to detect objects at the location of the raster 707.

Figure 8:
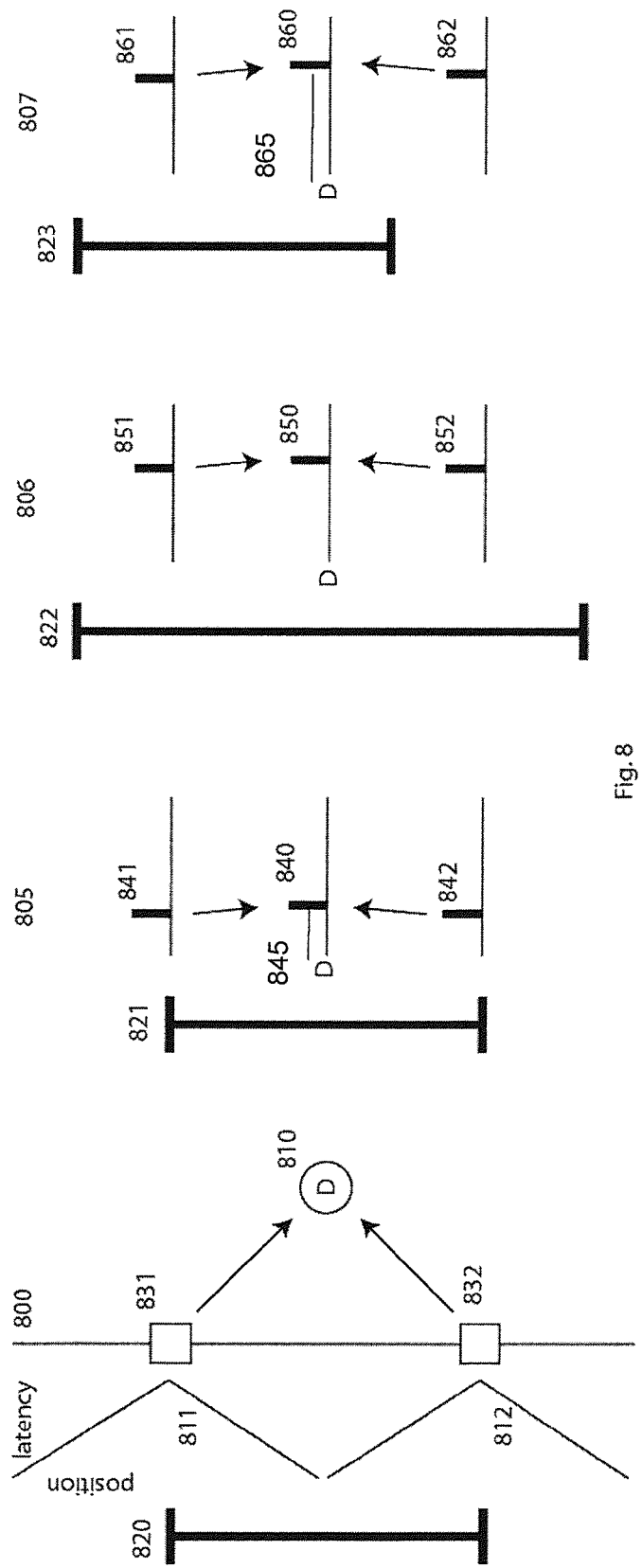
FIG. 8 is a block diagram of a second exemplary embodiment of the apparatus for encoding and decoding of objects invariantly with respect to their size and position.

FIG. 8 illustrates one embodiment of an apparatus that encodes and detects objects invariant of both size and position. The apparatus 800 includes an array of edge detectors (with only two detectors 831, 832 are shown for clarity) that are configured to the position of the edge into the pulse response latency according to latency distributions 811, 812, respectively. The exemplary distributions 811, 812 are configured to produce the smallest latencies when an object edge is at the optimal position. Pulse latency increases as the edge moves away from the optimum location. Other distributions may be used, such as e.g., a nonlinear distribution. The locations within the visual field that result in minimum pulse latencies correspond to the optimal object positions. Similarly, the size of the object that produces the smallest latency corresponds to the optimal object size.

As shown in the pulse rasters 805, 807, a bar of optimal size evokes synchronous response (pulse pairs 841, 842 and 861, 862, respectively) thereby causing positive detection responses 840, 860 from the detector 810 invariant to the position of the bars 821, 823. The detector 810 encodes the deviation (shift) of the object with respect to the preferred location into the absolute latency 845, 865, of detection response pulses 840, 860, respectively.

FIG. 9 illustrates two exemplary embodiments 900, 950 that encode and detect two-dimensional objects invariant of the object size. The first apparatus 900 includes an 8-by-8 matrix of line detectors, each configured to generate a pulse whenever a segment of a line of an appropriate orientation is present in their receptive fields. The generated pulses are transmitted along respective delay, with the latency indicated by a numeral inside the box corresponding to each detector. The pulse detector node (not shown but similar to the detector node 810 described supra with respect to FIG. 8) is configured to generate a detection signal upon receipt of sufficiently great number of coincident pulses from the line detectors.

When a square object 920 is introduced into the input signal, it elicits pulsed responses from the line detectors that correspond to the latency of three units, (or slightly larger, accounting for processing delays at the detector node). A smaller 921 or larger 922 object causes a different line detector subset to respond (e.g., the latency one (1) group and latency four (4) group, respectively). The pulses generated by the line detectors within each group arrive simultaneously to the pulse detector node, thereby triggering a detection response. The size of the square is encoded into the latency of the response pulse by the pulse detector node.

Another exemplary embodiment 950 shown in FIG. 9 contains four line detectors, 951-954, each connected to a pulse detector node (not shown). The center of each line detector 951-954 is depicted by a corresponding solid circle and the receptive area (also referred to as the sensing field) is depicted by the open rectangle surrounding the corresponding circle. Each line detector 951-954 generates a pulsed response whenever a segment of a line of appropriate orientation, corresponding to an object, is present in its receptive field. Furthermore, each detector 951-954 encodes deviation of the line segment position from the center of the receptive field into absolute pulse latency, such that the latency is the shortest when the line segment passes through the center of the respective line detector sensing field. Accordingly, latency is the largest when the segment line is proximate an edge of the detector receptive field.

A square object 970 causes the line detectors 951-954 to generate pulses that have the shortest latency. The generated pulses arrive to the pulse detector node at the same time, thereby resulting in a detection response. A smaller square 971 causes the line detectors to generate synchronous pulses with a longer latency, compared to the output caused by the object 970. Similarly, a larger object 972 elicits synchronous responses in the four line detectors with the latency that is also longer, compared to the output caused by the object 970. Therefore, the exemplary encoding apparatus 950 generates output pulses with the latency that is proportional to the deviation of the object size from an optimal size value. To distinguish between two objects that produce the same latency (i.e., one object being smaller than an optimal size, and another object being larger than the optimal size) a different latency distribution (e.g. quadratic) and/or another set of detectors may be used.

Other embodiment of the invention may comprise connections from edge or line detectors (as in FIGS. 6-10) to a detector node (or nodes) with different conduction delays. This way, each edge or line detector encodes the position of the edge or line into the output pulse latency, and in order for these pulses to arrive to the detector node at the same time, the pulses need to be generated at different times, in accordance with the conduction delays (see Izhikevich E. Polychronization: Computation with Spikes incorporated supra. In this implementation, the encoding apparatus detects objects that are shifted in position or size. One advantage of such an approach is that there could be a small number of elementary feature detectors (edges, lines, etc.) having connections (with different conduction delays) to a larger number of detector nodes, so that each detector node is tuned to detect objects of its own optimal combination of object size, position and orientation, and it encodes the deviation from the optimal combination (along one or more parameters) into the pulse latency of its response.

FIG. 10 illustrates an exemplary embodiment of encoding apparatus of the invention that is configured to encode and detect objects invariant to their orientation. The apparatus 1100 of FIG. 10 includes an array of line detectors 1001-1010 each configured to sense line objects at an appropriate orientation (e.g., an optimal or preferred orientation), denoted by a heavy line inside each of the corresponding boxes in FIG. 10. In the apparatus of FIG. 10 the line detectors 1001-1010 are arranged such that their optimal orientations point towards the center of the array. The numbers inside each square, corresponding to the respective line detector, denote the conduction delay to a pulse detector node (not shown). When an object 1020 is presented in the input signal, it elicits a pulsed response in line detectors 1003, 1008, as their optimal orientation matches the orientation of the object 1020. The generated pulsed responses simultaneously arrive to the pulse detector node with a delay of three units, thereby causing a positive detection response by the pulse detector node. As described above, the actual delay may be somewhat longer than the delay line delay value (e.g., three units) when accounting various processing delays.

An object of the same type and size but at a different orientation (at rotated bar 1021) causes pulsed output by a different line detector pair 1001, 1006 of the array 1011. The pulses generated by the line detectors 1001, 1006 arrive to the pulse detector node simultaneously with a conduction delay of one unit (or slightly longer), subsequently causing generation of a detection signal at the corresponding lag of one by the pulse detector node.

An object of the same type and size but at a different location (a shifted bar 1022) elicits pulsed responses from the line detectors 1002, 1009 of the array 1012. Because these line detectors correspond to delay lines of different latencies (e.g., four and two units, respectively), the pulses generated by the detectors 1002, 1009 do not arrive at the pulse detector node simultaneously. As a result, the pulse detector ignores the received pulses and does not produce a positive detection output signal. This object can be encoded and decoded invariantly with respect to position using the methods in FIGS. 1-9.

The exemplary embodiments described above with respect to FIGS. 1-10 encode information about object parameters (e.g., size, orientation, position) into a pattern of relative pulse latencies, which is transmitted along a plurality of communication channels to a pulse detector node acting acts as a decoder. The decoder, in turn, generates a pulsed output (detection signal) whenever an object of interest (that is with an appropriate combination of properties) is present in the input signal. The latency of the detector output pulse encodes information related to the parameters of the object, such as its size, position, or rotation.

In order to process signals corresponding to complex objects consisting of multiple object elements, a bank of elementary decoders, each configured to the appropriate element, is used. These decoder banks generate output pulses with latencies determined by the simpler object features, thus enabling the object detection system to generate an output pattern of relative pulse latencies that describe the complex object identity (e.g., a pattern 131 as shown in FIG. 1). The timing of the pattern (absolute latency 144 in FIG. 1) indicates the size, position, or rotation of the complex object. In one embodiment, the detector nodes may be arranged in a multi-layer cascade (e.g., as in FIG. 5) so the pattern of relative pulse latencies from one layer is fed into the detector nodes of the subsequent layer for further processing.

It will be appreciated by those skilled in the arts, that although objects comprising straight linear features are illustrated in FIGS. 1-10 for clarity, approaches described herein are equally applicable to objects of any arbitrary shape including these comprising curves and or curved features and edges, openings, orifices.

Exemplary Uses and Applications of Certain Aspects of the Invention

The foregoing descriptions of the invention are intended to be illustrative, and not in any way limiting; those skilled in the art will appreciate that the invention can be practiced with various combinations of the functionalities and capabilities described above, and can include fewer or additional components than described above. Certain additional aspects and features of the invention are further set forth below, and can be obtained for example using the functionalities and components described in more detail above.

Embodiments of the present invention described above with respect to FIGS. 1-10 provide improved apparatus and methods for object detection that are invariant to predetermined object properties. Specifically, these methods allow reduction in the number of detectors that are required to detect the same object for all multitudes of object properties (e.g., a bar of different size, orientation and at all possible locations). These improvements advantageously translate into a system that requires fewer detectors and fewer processing units, compared to the prior art, and that allows taking advantage of the combinatorial richness of the pulse code.

Advantageously, exemplary embodiments of the present invention encode the irrelevant (to the identity of the object) parameters into group delay of the pattern of relative pulse latencies. Therefore, the need for additional mechanisms that scale the object of interest (either up or down) and/or shift the object into an optimal position is alleviated. Additionally, the need for redundant detectors that cover all possible ranges of object locations and sizes is reduced as well.

Object recognition embodiments of the present invention are useful in a variety of devices including without limitation prosthetic devices, autonomous and robotic apparatus, and other electromechanical devices requiring object recognition functionality. Examples of such robotic devises are manufacturing robots (for example, automotive), military, medical (such as processing of microscopy, x-ray, ultrasonography, tomography). Examples of autonomous vehicles include rovers, unmanned air vehicles, underwater vehicles, smart appliances (e.g. ROOMBA®), etc.

Embodiments of the present invention are further applicable to a wide assortment of applications including computer human interaction (including for example recognition of gestures, voice, posture, face, etc), controlling processes (e.g., an industrial robot, autonomous and other vehicles), augmented reality applications, organization of information (e.g., for indexing databases of images and image sequences), access control (for instance, opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the present invention can be used to simplify tasks related to motion estimation, such as where an image sequence is processed to produce an estimate of the object position (and hence velocity) either at each points in the image or in the 3D scene, or even of the camera that produces the images. Examples of such tasks are: egomotion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another implementation, portions of the object recognition system are embodied in a remote server configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus, comprising:
an encoder configured to receive and encode a first input representative of a feature into a plurality of pulses, the plurality of pulses being transmitted along a plurality of channels, wherein:
the first input representative of the feature comprises a visual image of the feature;
information related to an identity of the feature is encoded into a pattern of latencies of the plurality of pulses relative to one another; and
a parameter associated with the feature is encoded into a group delay that is (i) common to all pulses within the plurality of pulses and (ii) common to all channels within the plurality of channels.

2. The apparatus of claim 1, wherein the parameter comprises one or more of position, size, and orientation of the feature.

3. The apparatus of claim 1, wherein the group delay is configured based at least in part on an event.

4. The apparatus of claim 1, wherein the encoder comprises a preferred parameter range and the group delay is selected responsive to a deviation of the parameter from a preferred parameter range.

5. The apparatus of claim 1, further comprising a control interface, the control interface configured to provide an interface signal based at least in part on detection of a predetermined parameter in the first input.

6. The apparatus of claim 5, wherein the interface signal is adapted for delivery to a second apparatus selected from the group consisting of: (i) a robotic apparatus; and (ii) a prosthetic apparatus.

7. The apparatus of claim 1, wherein at least a portion of the plurality of pulses is configured to be generated responsive to an event.

8. The apparatus of claim 7, wherein the event is selected from the group consisting of: (i) a temporal change in the first input; (ii) a spatial change in the first input; (iii) a trigger; and (iv) a timer alarm related to a second event, the second event preceding the event.

9. The apparatus of claim 1, further comprising at least one detector coupled to the encoder via the plurality of channels, the plurality of channels forming a plurality of connections; wherein:
the plurality of pulses are configured for transmission through at least a subset of the plurality of connections;
each of the plurality of connections is associated with a transmission delay configured to effect a coincident arrival of at least two of the plurality of pulses at the at least one detector; and
the coincident arrival is invariant to a change in a value of the parameter.

10. The apparatus of claim 9, wherein information related to two substantially different parameters of the feature is transmitted via two different subsets of the plurality of connections.

11. The apparatus of claim 10, wherein:
a first plurality of transmission delays corresponds to a first subset of the two different subsets;
a second plurality of transmission delays corresponds to a second subset of the two different subsets; and
the first plurality of transmission delays is not identical to the second plurality of transmission delays.

12. The apparatus of claim 9, wherein the at least one detector is configured to generate a detection signal based at least in part on the coincident arrival.

13. The apparatus of claim 12, further comprising a processing apparatus coupled to the at least one detector and configured to receive the detection signal and to generate a response;
wherein:
the detection signal having a detection signal latency configured based at least in part on the group delay; and
the response is configured invariant to the parameter.

14. The apparatus of claim 12, wherein information related to two different parameters of the feature is transmitted via two respective different subsets of the plurality of connections.

15. The apparatus of claim 9, wherein an adjustment of at least a portion of the plurality of connections is configurable based at least in part on a second input, the second input temporally preceding the first input.

16. The apparatus of claim 9, wherein the plurality of channels comprises one or more virtual channels carried in a physical transmission medium.

17. The apparatus of claim 1, further comprising a plurality of nodes coupled to the encoder via a plurality of transmission lines and forming a plurality of connections, each of the plurality of connections associated with a connection delay forming a plurality of delays; and
wherein the plurality of delays is configured to effect a coincident arrival of at least two of the plurality of pulses to at least one of the plurality of nodes, the coincident arrival invariant to a change in the parameter.

18. The apparatus of claim 17, wherein the least one of the plurality of nodes is configured to generate a detection signal based at least in part on the coincident arrival.

19. The apparatus of claim 17, wherein at least a portion of the plurality of connections is modified based at least in part on a second input, the second input temporally preceding the first input.

20. A method of encoding sensory information, comprising:
encoding an input comprising a representation of a feature into a pulse group, the pulse group being transmitted along a plurality of channels;
where the input comprises a visual image of the feature;
wherein:
information related to an identity of the feature is encoded into a pattern of pulse latencies, relative one pulse to another within the group; and
encoding a parameter associated with the feature into a group delay that is common to all pulses within the pulse group and common to all channels within the plurality of channels.

21. The method of claim 20, wherein the parameter comprises one or more of a position, size, and/or orientation of the feature.

* * * * *